United States Patent [19]
Bragg, Jr.

[11] Patent Number: 6,086,014
[45] Date of Patent: Jul. 11, 2000

[54] ROADABLE AIRCRAFT

[76] Inventor: Albert J. Bragg, Jr., 7052 Sundance Dr., Warrenton, Va. 20187

[21] Appl. No.: 09/132,911

[22] Filed: Aug. 12, 1998

[51] Int. Cl.$^7$ .................................................. B64C 37/02
[52] U.S. Cl. ................................................. 244/2; 244/49
[58] Field of Search ................................ 244/2, 49, 220, 244/221, 50, 100 R

[56] References Cited

U.S. PATENT DOCUMENTS

| 4,627,585 | 12/1986 | Einstein | 244/2 |
|---|---|---|---|
| 4,986,493 | 1/1991 | Sarch | 244/2 |

*Primary Examiner*—J. Woodrow Eldred
*Attorney, Agent, or Firm*—Richard C. Litman

[57] ABSTRACT

A roadable aircraft includes three symmetrically lateral flight surfaces, comprising a forward main wing generally centrally located relative to the fuselage or body, a rearwardly located stabilizing surface acting as an empennage support, and a rear stabilizer and elevator located at the rearward end of the empennage tail booms. The wheel or landing gear configuration is of a rhomboid pattern, with forward and rearward main wheels along the centerline of the craft, and left and right outboard wheels. The outboard wheels extend and retract individually to a limited degree to compensate for centrifugal forces in ground operations, and together in coordination with the main wheels for flight operations. The powerplant drives the rearward main wheel from one end of its output shaft, and the propeller from the opposite end of the output shaft. The flight surfaces are foldable alongside and over the top of the rear portion of the craft for ground operations, or may be quickly and temporarily removed for ground operations as desired. Operator controls to facilitate both surface and flight operations are configured for operator convenience and rapid conversion between surface and flight operation configurations. Additional safety and convenience features, such as a starter lockout to assure that all flight surfaces and controls are properly connected, are also provided. The craft is quickly and easily convertible from flight configuration to road configuration, and back, to enable the operator thereof to use the craft as desired in either environment.

69 Claims, 17 Drawing Sheets

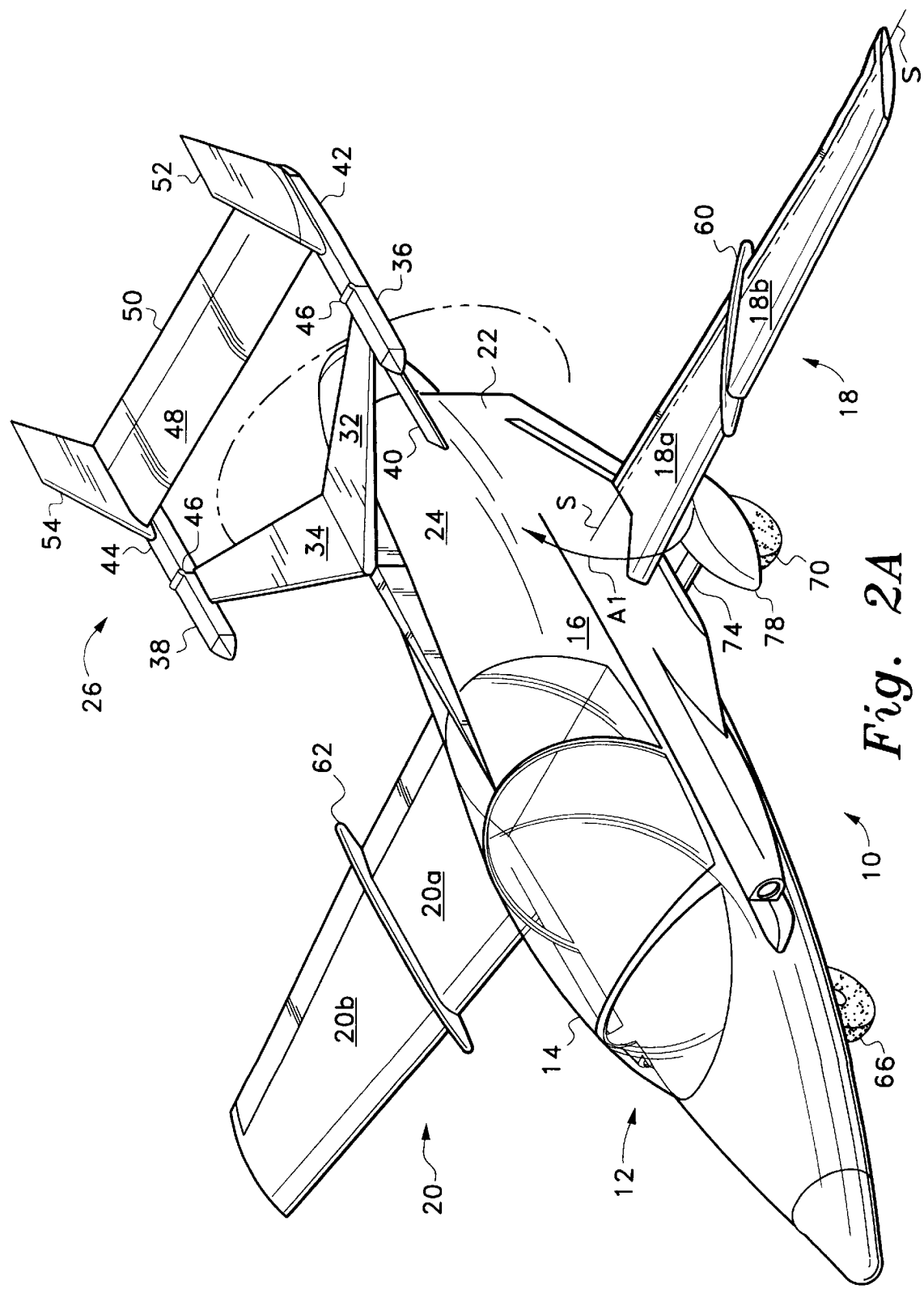

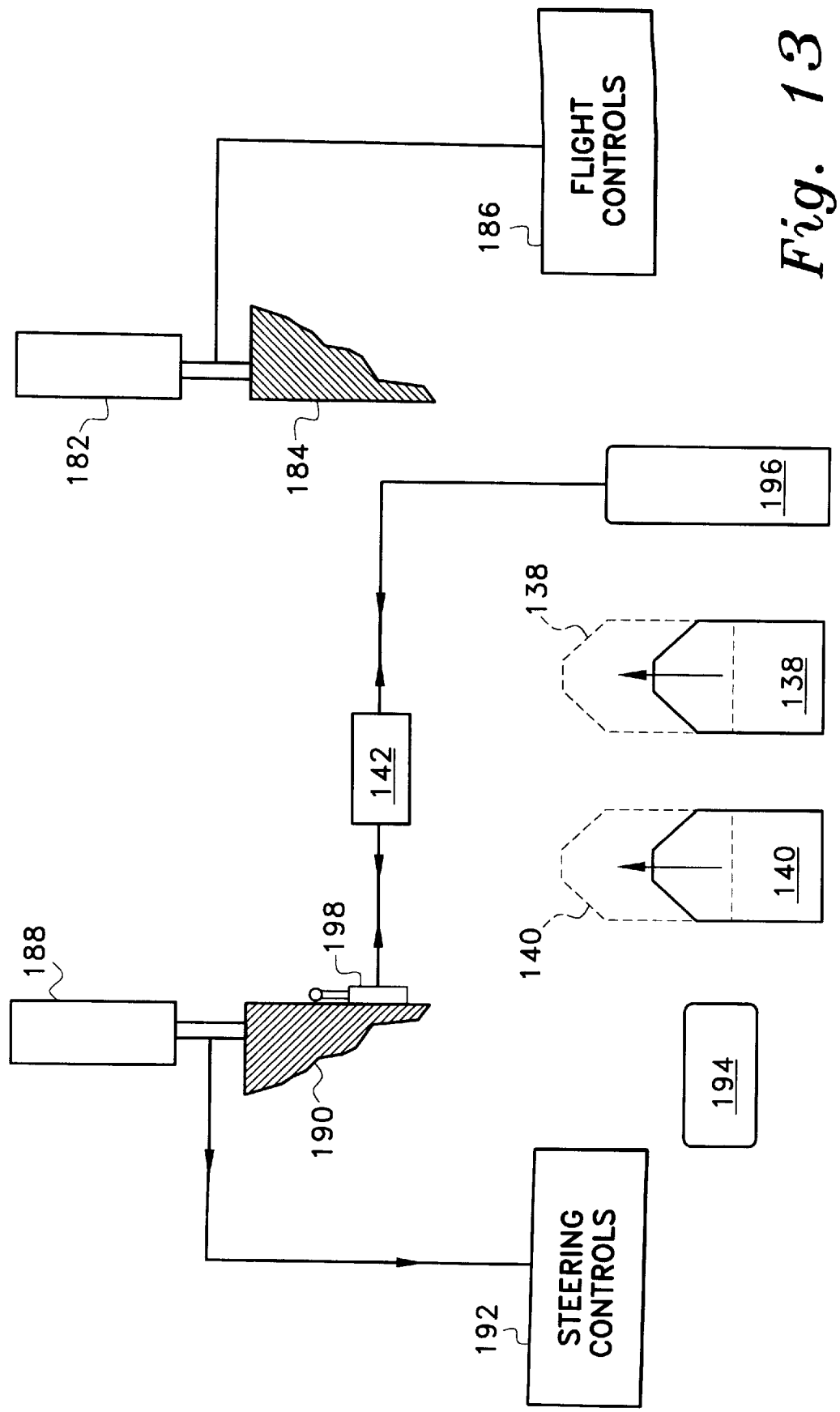

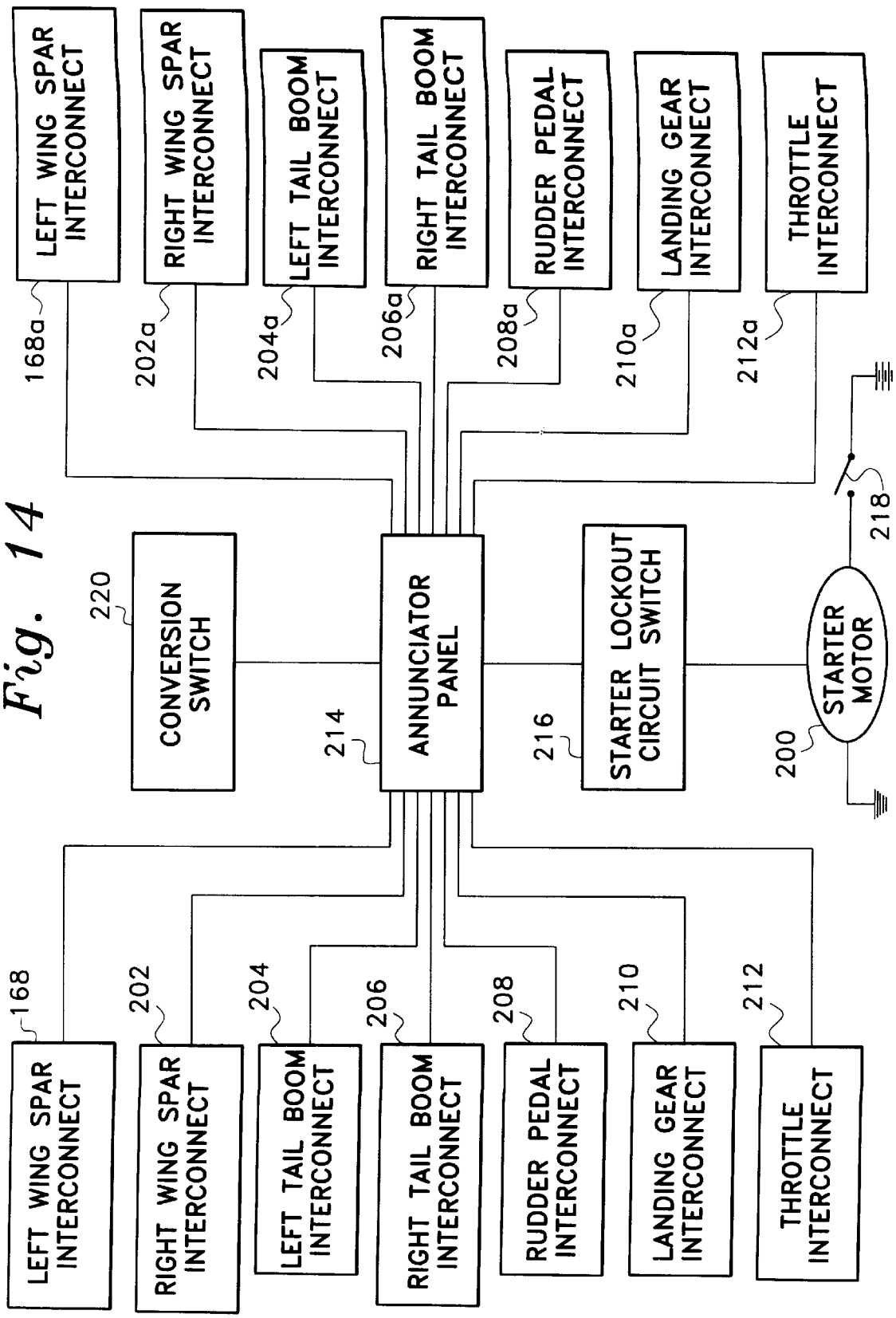

ROADABLE AIRCRAFT

BACKGROUND OF THE INVENTION

1. Field of the Invention

The present invention relates generally to motorized transportation vehicles, and more specifically to an aircraft having a configuration allowing it to be interchangeably converted to a roadable vehicle. The aircraft includes numerous novel features relating to the practicality and safety of such a vehicle, such as the folding or removal of the flight components, engine and drive system, landing gear and wheel system, and other novel features and components.

2. Description of the Related Art

The goal of a motor vehicle which is capable of both flight and operation on the roads and highways, has been a dream since shortly after the development of the first powered aircraft in the early part of the twentieth century. Numerous persons have attempted to produce such a combination machine, generally known as a flying car or roadable aircraft. Many of these attempts have been successful, and in two cases the machines have been type certificated by the Civil Aeronautics Agency (now the Federal Aviation Administration) as production aircraft.

However, none of these various machines have been particularly practical or commercially successful, primarily due to the vast difference in structural requirements for the two different environments. In order to be truly practical, the flight components of the vehicle must be capable of being carried by, or with, the remainder of the vehicle during ground operations, which lessens the capacity of the land vehicle. Accordingly, the flight components must be relatively small and quite efficient, in order to be capable of being carried or towed readily by the remainder of the vehicle on the ground.

The other side of this problem is that in order to produce an efficient aircraft, the structure must be relatively lightweight, which is at odds with the requirements for a ground vehicle and the constant abuse such a vehicle must endure over rough and potholed surfaces. When the ground portion of the vehicle is built sufficiently strongly to accept the stresses of road and highway use, flight performance suffers due to the weight of the vehicle. In some instances, this has resulted in flight components which could not be disassembled or folded to the extent required to allow carriage or towing by the ground portion of the vehicle. Again, while some attempts at producing such a hybrid vehicle have met with limited success, none to the present have been truly successful, primarily due to the obstacles noted above.

A discussion of the related art of which the present inventor is aware, and its differences and distinctions from the present invention, is provided below.

U.S. Pat. No. 2,713,465 issued on Jul. 19, 1955 to Harry E. Novinger describes a Combined Air-Ground Vehicle having an airfoil shaped forward fuselage or body and an upwardly and rearwardly disposed wing, resulting in a negative stagger biplane configuration. The fuselage and rearward wing are connected by large side members serving as end or tip plates for the relatively low aspect ratio fuselage and wing. The flight components cannot be folded or disassembled for ground use of the vehicle, as in the present roadable aircraft, with Novinger's short span, low aspect ratio upper wing and fuselage having a width allowing for unrestricted travel on the road. The tricycle wheel arrangement of the Novinger machine is unlike the more stable rhomboid pattern of the wheels of the present roadable aircraft.

U.S. Pat. No. 2,767,939 issued on Oct. 23, 1956 to Moulton B. Taylor describes a Flying Automotive Vehicle Assembly, comprising a left and right wing structure, tail cone structure, and empennage, all of which are separable from a central automobile or cabin structure. While the wings fold rearwardly, as in the present roadable aircraft, they fold against the tail cone of the assembly, which is removed from the automobile or cabin structure and towed therebehind for road use. The automobile or cabin structure is built extremely lightly for efficiency as an aircraft, with relatively small and light wheels and tires serving for both road use and for takeoffs and landings. This is one of only two roadable aircraft or flying car designs ever certificated for production by the CAA or FAA.

U.S. Pat. No. 2,940,688 issued on Jun. 14, 1960 to Edward F. Bland describes a Roadable Aircraft And Sailboat having a lifting body configuration somewhat in the manner of the fuselage shape of the Novinger craft discussed further above. However, the rear fuselage includes a central channel before the rear propeller, somewhat in the manner of one nacelle or channel of the twin engine Custer Channel Wing aircraft developed in the 1950s. The Bland craft also includes folding wings, which may be folded with their spans rearwardly atop the fuselage for road use, or which may be extended vertically to serve as sails. The craft includes many features which increase the weight significantly, and thus utilizes two engines, one for road and water use and the other for airborne use. However, the two engines may be linked together to provide the required power for takeoff and climb when used as an aircraft. This arrangement is unlike the single engine configuration of the present roadable aircraft.

U.S. Pat. No. 3,012,737 issued on Dec. 12, 1961 to David R. Dodd describes a Combination Land And Air Vehicle having a twin boom tail assembly and folding wings. The wings, however, fold in a spanwise direction as well as at the roots, with the leading portion folding forwardly and horizontally next to the fuselage, and the rearward portion folding downwardly to form an essentially vertical surface parallel to the fuselage sides when folded. The tail assembly does not fold, as in the present roadable aircraft. Also, the tricycle wheel configuration is unlike the rhomboid wheel configuration of the present craft.

U.S. Pat. No. 3,371,886 issued on Mar. 5, 1968 to Robert O. Schertz describes an Aircraft Adapted For Highway Usage, having a rearwardly disposed main wing and a forwardly disposed canard surface. The basic fuselage structure and four wheel configuration are somewhat like those of the Taylor flying automobile assembly discussed further above, but the Schertz fuselage is relatively short coupled in that no separable tail cone is provided. Rather, Schertz places vertical tail surfaces extending upwardly from the rearwardly disposed wing, and relies upon the forward canard surfaces for pitch control in flight. The wings each include a double folding mechanism, and fold with both portions of each wing in a vertical plane alongside their respective vertical surfaces for highway use, but do not fold rearwardly to lower the height of the vehicle for road use, as in the present roadable aircraft.

U.S. Pat. No. 4,269,374 issued on May 26, 1981 to Harvey R. Miller describes a Combined Road Vehicle And Aircraft, in which the wings, tail assembly, and propeller drive all fold into the structure of the body or cabin portion for carriage during road use. The wings fold along the spar, similarly to the folding configuration of the Dodd craft discussed further above. The wheel arrangement is a conventional rectangular configuration, except that the nondriven rear wheels are capable of inward articulation to provide room for the wings when folded. The front wheels are driven for road use. The lack of intermediate folding for the wings, conventional wheel layout, and other features result in a craft unlike that of the present invention.

U.S. Pat. No. 4,778,129 issued on Oct. 18, 1988 to Frank Byford describes a Control Surface Drive For Folding Wing Aircraft, wherein the control surfaces remain connected at all times when the wing is folded or extended. The Byford control linkage cannot be used with a wing folding system where the wing is rotated about a spanwise axis during one step of the folding process, as in the present roadable aircraft invention. The rotational and rearward folding of the wing of the present roadable aircraft is not adaptable to the Byford control linkage, and uses a different principle of connecting the flight controls when the wings and tail assembly are extended for flight. The present system disconnects the flight controls when the flight components are folded, unlike the Byford control linkage.

U.S. Pat. No. 4,881,701 issued on Nov. 21, 1989 to Gary M. Bullard describes a Combination Automobile And Airplane having a two place tandem, pusher engine, canard configuration, somewhat like the configuration of the Vari-Eze and Long-Eze aircraft designs of Burt Rutan. However, the canard tips each include a steerable front wheel therein, and two rear wheels extend below the rearward main lifting surface and are driven by shafts extending outwardly below the inboard portions of the wing. The outboard portions of the wing are capable of double folding to lie over the top of the rear fuselage for road use. The propeller is not removable or foldable, but is disengaged for road use. No folding tail boom structure or rearwardly folding wing structure is provided, as is provided in the present roadable aircraft.

U.S. Pat. No. 5,050,817 issued on Sep. 24, 1991 to Harvey R. Miller describes a Combined Road And Aircraft Vehicle of a similar configuration to the vehicle of the '374 U.S. Patent to the same inventor, discussed further above. The primary difference is that the vehicle of the '817 Patent stores the wings along the sides of the road vehicle, rather than in storage compartments in the sides of the road vehicle, as in the '374 Patent. Other features, e. g., tail folding, are similar between the two Miller patents, and are unlike the means used in the present invention.

U.S. Pat. No. 5,435,502 issued on Jul. 25, 1995 to Kenneth G. Wernicke describes a Flying And Road Vehicle of a configuration similar to that of the '465 U.S. Patent to Novinger discussed further above, i. e., having a relatively low aspect ratio wing to meet maximum road width requirements without folding. None of the Wernicke flight components are foldable, unlike the multiple folding flight components of the present roadable aircraft.

Finally, a publication titled *Roadable Aircraft—From Wheels To Wings,* by Palmer Stiles, copyright 1994 and published by Custom Creativity, Inc., Melbourne, Fla., includes a comprehensive, but not exhaustive, collection of at least portions of U.S. Utility and Design Patents issued for roadable aircraft and flying automobiles. None of the patents published in the book, but not discussed in detail further above, are felt to be more closely related to the present invention than those discussed herein.

None of the above inventions and patents, either singly or in combination, is seen to describe the instant invention as claimed.

SUMMARY OF THE INVENTION

The present invention comprises a roadable aircraft, which may be reversibly changed from an aircraft configuration to a roadable vehicle configuration by folding and/or removing the flight components of the vehicle. The aircraft configuration comprises a three surface layout, with a generally centrally located main wing and the remaining two surfaces serving as a "split stabilizer," with the fixed forward surface thereof also serving as an attachment for the empennage structure.

The present roadable aircraft uses a rhomboid wheel or landing gear configuration. This system comprises a rearwardly disposed, centerline main or drive wheel, a forwardly disposed, centerline steerable nose wheel, and left and right outboard wheels which are selectively extendible and retractable to assist in counteracting centrifugal force when the vehicle is turning on the ground.

The wing structure provides for compact folding through a double folding of each wing panel and the rearward rotation of each folded panel. The empennage folds arcuately upwardly and forwardly to lie over the rear portion of the vehicle for road use. All of the flight components may be completely removed from the rest of the vehicle, if so desired.

The drive system for the present roadable aircraft comprises a powerplant which drives the single rear wheel through an automatic transmission. The same powerplant also drives the propeller from the opposite end of its output shaft. Power is selected to drive either the drive wheel or propeller, as required.

Accordingly, it is a principal object of the invention to provide an improved roadable aircraft having three symmetrically lateral flight surfaces, comprising a main wing, an empennage brace structure and central surface, and a rearwardly disposed stabilizer and elevator surface.

It is another object of the invention to provide an improved roadable aircraft including multiply folding flight components, which components may remain attached to the roadable structure or reversibly removed as desired, for ground use.

It is a further object of the invention to provide an improved roadable aircraft having a rhomboid wheel or landing gear configuration, with forward and aft main wheels and left and right outboard wheels, which outboard wheels raise and lower to compensate for centrifugal force when turning on the ground.

An additional object of the present invention is to provide an improved roadable aircraft having a powerplant with road wheel drive means and propeller drive means selectively engageable from the powerplant, starter lockout means, control engagement means, and other features particularly adapted to the safety and performance of the present craft.

It is an object of the invention to provide improved elements and arrangements thereof in an apparatus for the purposes described which is inexpensive, dependable and fully effective in accomplishing its intended purposes.

These and other objects of the present invention will become apparent upon review of the following specification and drawings.

BRIEF DESCRIPTION OF THE DRAWINGS

FIG. 2A is a perspective view of the craft showing the first stage in folding the wings of the craft for ground operation.

FIG. 13 is an elevation view showing the general layout of the various flight and ground controls, and interconnection means.

FIG. 14 is a schematic diagram showing the various systems interconnected to provide a starter lockout means for ensuring that the vehicle is in a safe configuration before starting.

Similar reference characters denote corresponding features consistently throughout the attached drawings.

DETAILED DESCRIPTION OF THE PREFERRED EMBODIMENT

Figure 1:
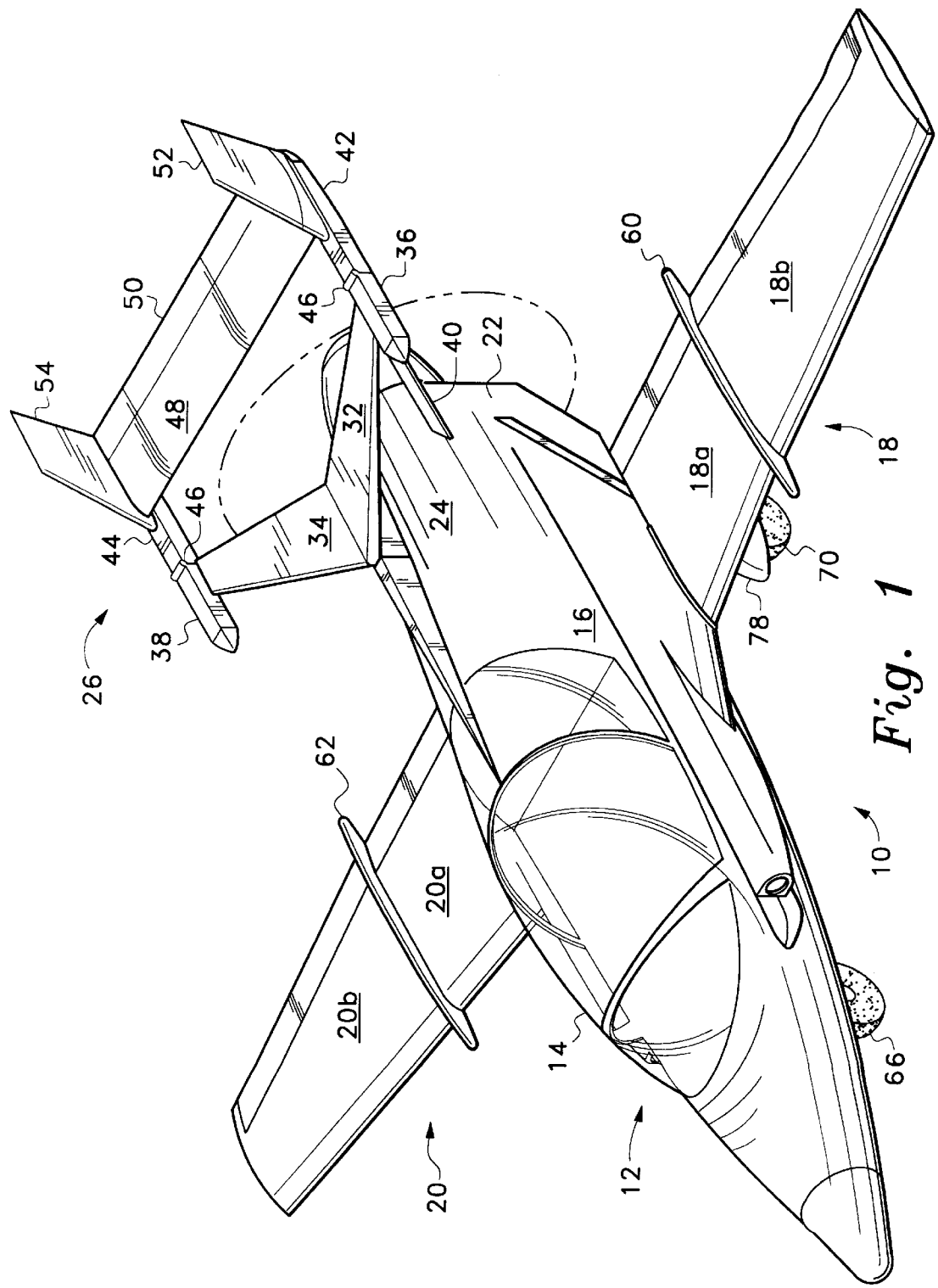
FIG. 1 is a perspective view of the present roadable aircraft in flight configuration.

The present invention comprises a roadable aircraft, i. e., an aircraft which aerodynamic flight surfaces are foldable and/or removable to permit use of the fuselage or body structure of the vehicle on roads and other surfaces as desired. FIG. 1 provides a perspective view of the present roadable aircraft, indicated by the reference character 10, and showing its general features. The roadable aircraft 10 includes a fuselage or body structure 12 having a forward portion 14 including seating for at least one occupant (preferably at least two or more, depending upon the size and configuration of the roadable aircraft 10).

Figure 6:
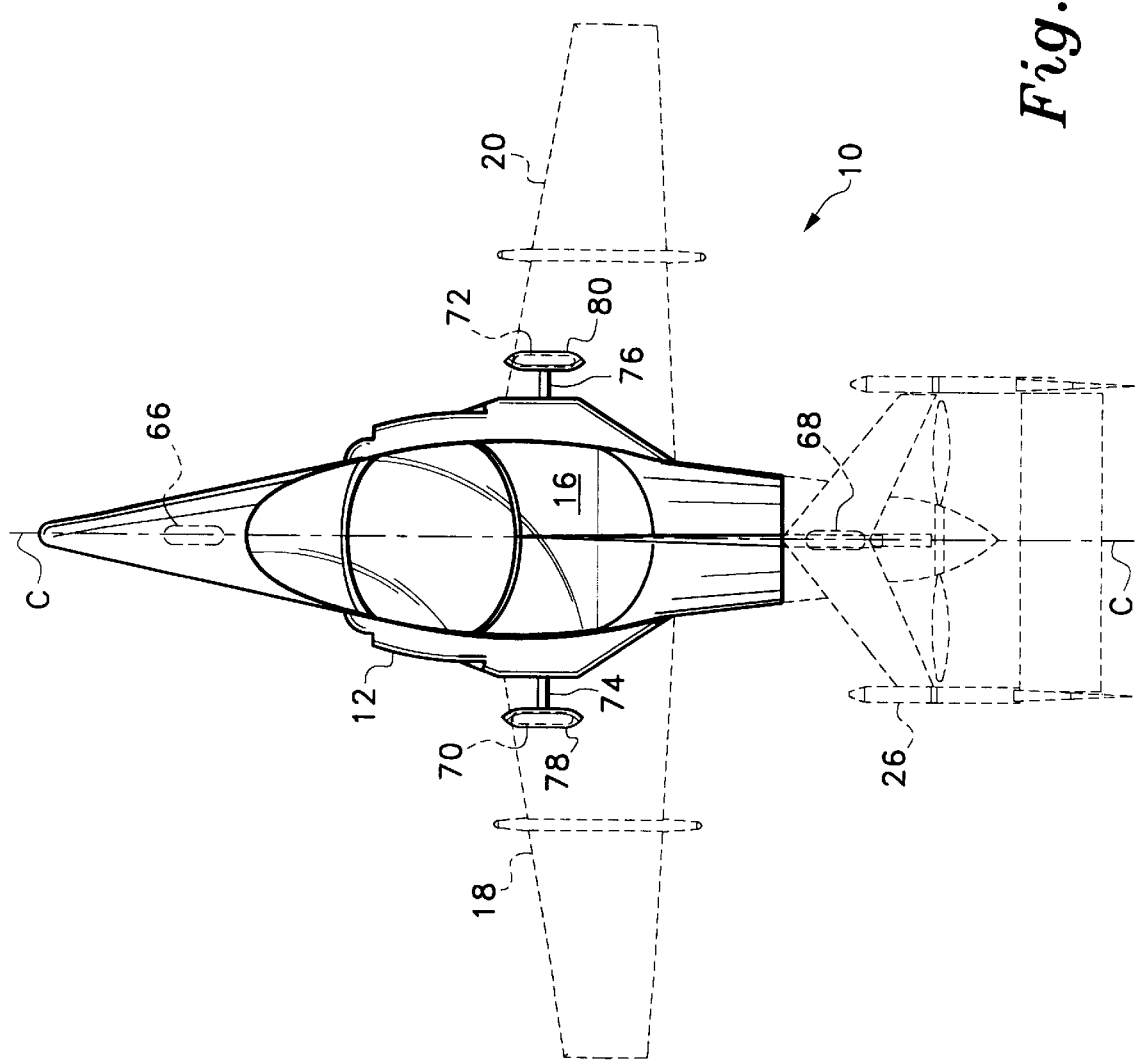
FIG. 6 is a top plan view of the present roadable aircraft, showing the rhomboid wheel or landing gear configuration, with the removable flight components being shown in broken lines.

The central portion 16 of the body 12 includes a left wing panel 18 and an opposite right wing panel 20 foldably and removably attached thereto, with the folding and attachment means described in detail further below. An engine or powerplant 28 is installed in the central portion 16 of the fuselage or body structure 12, or at least generally rearwardly of the rearmost occupant seating portion 14 of the forward portion 14 of the structure 12, as shown in FIG. 6 of the drawings and discussed in detail further below. The engine 28 drives a rearwardly located propeller 30 by means of a drive train discussed further below.

The rear portion 22 of the body 12 includes an upper portion 24, with an empennage assembly 26 extending rearwardly therefrom. the empennage assembly is also removably secured to the upper rear portion 24 of the body structure 12, and/or may be folded in order to use the present roadable aircraft 10 on the surface.

The empennage assembly 26 of the present roadable aircraft 10 provides several structural and aerodynamic advantages, in comparison to more conventional aircraft tail groups. The empennage group 26 includes forwardmost (but still located behind the wings 18 and 20) left and right flight surfaces, respectively 32 and 34, extending from the upper rear portion 24 of the fuselage or body structure 12. A left and a right tail boom, respectively 36 and 38, extend rearwardly from the outboard end of each respective flight surface 32 and 34. (Additional bracing 40, in the form of a supplemental aerodynamic surface or streamlined brace, may be provided from each side of the upper rear portion 24 of the fuselage 12, to triangulate the flight surface 32 and 34 and upper rear fuselage portion 24, for greater structural strength.) Each tail boom 36 and 38 has a rear portion, respectively 42 and 44, which is secured to its respective forward portion by a hinge mechanism 46 to allow the tail booms 36 and 38 to be folded upwardly and forwardly over the upper rear portion 24 of the body or fuselage 12. The rearmost portions 42 and 44 of the two tail booms 36 and 38 include a horizontal stabilizer 48 and elevator surface 50 extending therebetween, with the present craft 10 thus having a triple horizontal flight surface configuration, comprising the main wings 18 and 20, the forwardmost empennage surfaces 32 and 34, and the horizontal stabilizer and elevator 48 and 50. The plane of rotation of the propeller 30 lies between the forwardmost empennage surfaces 32 and 34, and the horizontal stabilizer 48, with the empennage structure 26 being generally above the propeller.

Each of the rearmost portions 42 and 44 of the two tail booms 36 and 38 includes a vertical flight surface, respectively 52 and 54, extending upwardly therefrom, which actually define the two ends of the horizontal stabilizer 48. The two vertical surfaces 52 and 54 may each be somewhat smaller than the conventional single surface, while still providing sufficient rearward vertical area for the desired lateral stability for the craft while in flight. However, it is not necessary that both of these surfaces 52 and 54 include movable rudder components, although this is possible. Preferably, only one of the vertical surfaces 52 and 54 is movable, e. g., the left surface 52, to provide the desired yaw control. The single movable surface 52 provides sufficient yaw control for the craft 10, while also simplifying the control system.

Figure 12:
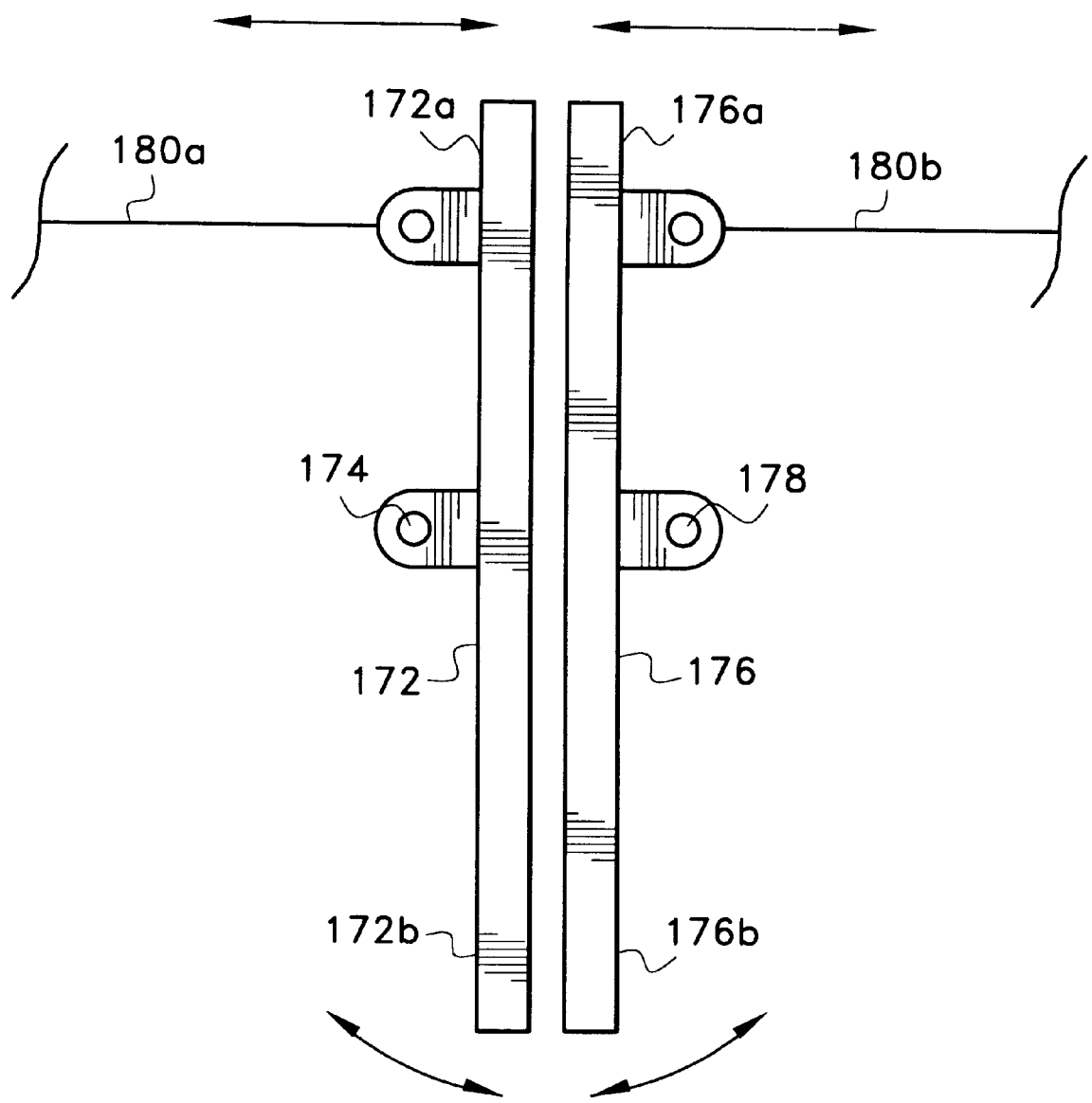
FIG. 12 is a plan view of the positive control interconnect means used in the present roadable aircraft.

FIGS. 2A through 2E show the steps or procedure in folding the various flight components from their flight configuration to their folded configuration, for using the present roadable aircraft 10 for surface transportation. Each of the two wing panels 18 and 20 secures to the fuselage or body structure 12 by means of main or forward and rearward spar attachments. A detailed view of a forward spar attachment 56 (which principle is also used to secure the inboard and outboard wing panels and the rearward portions 42 and 44 of the two tail booms 36 and 38) is shown in FIG. 12, and discussed in detail further below. The rear spar attachment 58 comprises a conventional U-joint like structure, shown generally in FIG. 5, which allows both entire wing panels 18 and 20 to be rotated about a spanwise axis S and pivoted rearwardly for folding.

FIG. 2A illustrates the first step in the folding of the two wing panels 18 and 20. (While only the left wing panel 18 folding operation is shown, it will be understood that the folding operation for the right wing panel 20 is a mirror image of that illustrated and described for the left panel 18.) Initially, the upper and lower spar attachment pins are withdrawn from the main spar attachment fittings (the operation is discussed further below, in a discussion of the apparatus of FIG. 12), to allow the forward portion of the wing 18 to be freed from its mating structure of the fuselage or body portion 12. The wing panel 18 is then rotated in a clockwise direction (as viewed from the tip of the left wing 18, looking toward the fuselage 12) about the rear spar attachment to raise the leading edge and lower the trailing edge, as shown by the rotational direction arrow A1 in FIG. 2A. As the main spar attachment 56 accepts virtually all bending loads in flight, the rear spar attachment 58 need only accept shear loads due to the pitching coefficient of the wing, and tension and compression loads. Thus, a joint which allows rotation and bending thereabout is satisfactory for the rear spar attachment 58.

Figure 2B:
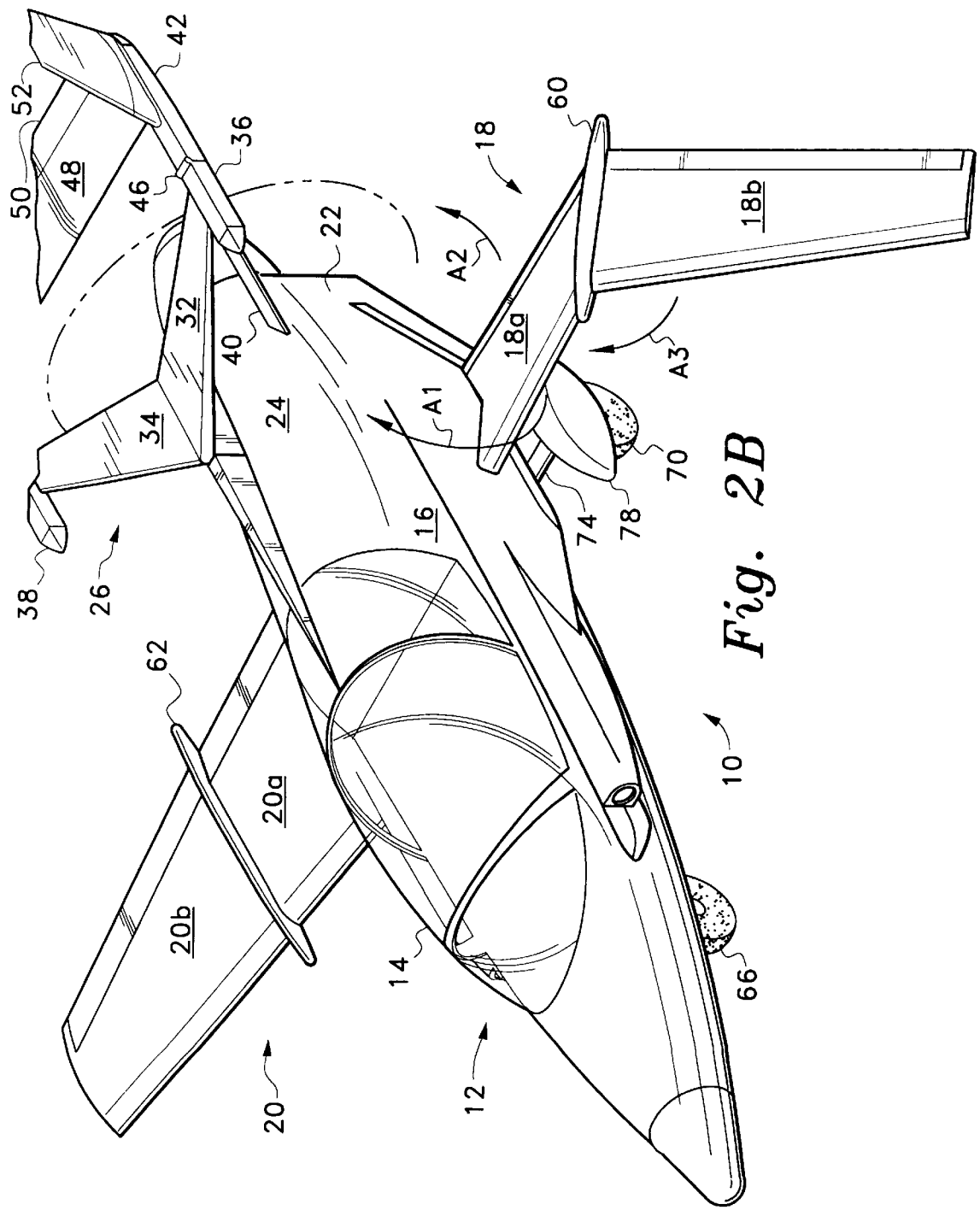
FIG. 2B is a perspective view of the present roadable aircraft showing the second step in folding the aircraft wings.
Figure 2C:
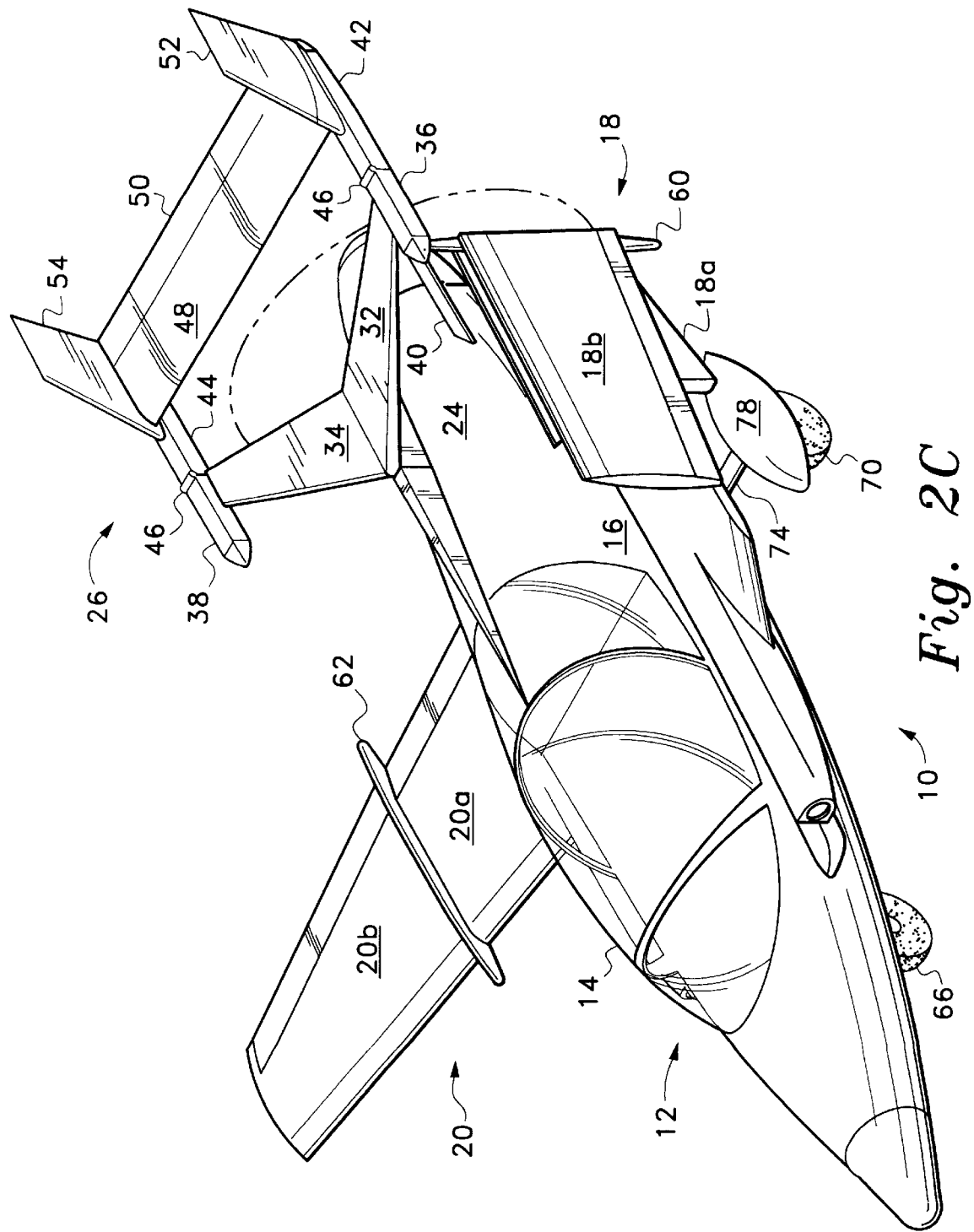
FIG. 2C is a perspective view of the present roadable aircraft showing the final step in folding the wings of the aircraft against the fuselage for ground operation.

FIG. 2B illustrates the next step in the wing folding process for the roadable aircraft 10, with the folding of the inner and outer wing panels 18a and 18b. (The spanwise rotation of the wing 18 is shown in about the same position as shown in FIG. 2A. However, the wing 18 is rotated clockwise a total of about ninety degrees to complete the rotational step of the folding process, as shown in FIG. 2C where the wing 18 is completely folded.)

Once the wing panel 18 has been rotated essentially ninety degrees clockwise, with the leading edge up and the trailing edge down, as indicated by the rotational arrow A1 of FIGS. 2A and 2B, The wing panel 18 may then be folded rearwardly along the rear portion 24 of the fuselage or body structure 12, as indicated by the rearward folding arrow A2 in FIG. 2B.

For aerodynamic efficiency, the aspect ratio of each of the wing panels results in a relatively wide span. Thus, if each wing panel 18 and 20 were trailed rearwardly from the rear spar attachment point as single, unbroken panels, the wingtips would extend rearwardly past the rear of the fuselage structure 12 to an excessive degree. Accordingly, each wing panel 18 and 20 is formed of an inboard and an outboard panel, respectively 18a and 18b for the left wing panel 18, and 20a and 20b for the right wing panel 20. An intermediate folding axis or hinge line, covered by respective fairings 60 and 62 (which also serve to a certain extent as flow fences for each of the wing panels 18 and 20), is provided between each of the panels 18a, 18b and 20a, 20b. The attachment fitting 56 between each respective set of inboard and outboard panels 18a, 18b and 20a, 20b may be as shown in detail in FIG. 12 and as used for the main spar attachment between the inboard wing panels 18a and 20a, and their respective fuselage 12 attachment points.

Each wing panel 18 and 20 is folded chordwise along the hinge axis or line represented by the respective fairings 60 and 62, as shown by the folding arrow A3 at the mid-span position of the left wing panel 18. The lower surfaces of each panel 18a and 18b are folded toward one another, i. e., the outboard panel 18b is folded downwardly and under to lie below the inboard panel 18a, if the inboard panel 18a were to remain generally horizontal. The completely folded left wing 18 is shown folded alongside the rear portion 22 of the fuselage or body structure 12 of the craft 10, in FIG. 2C.

Figure 2D:
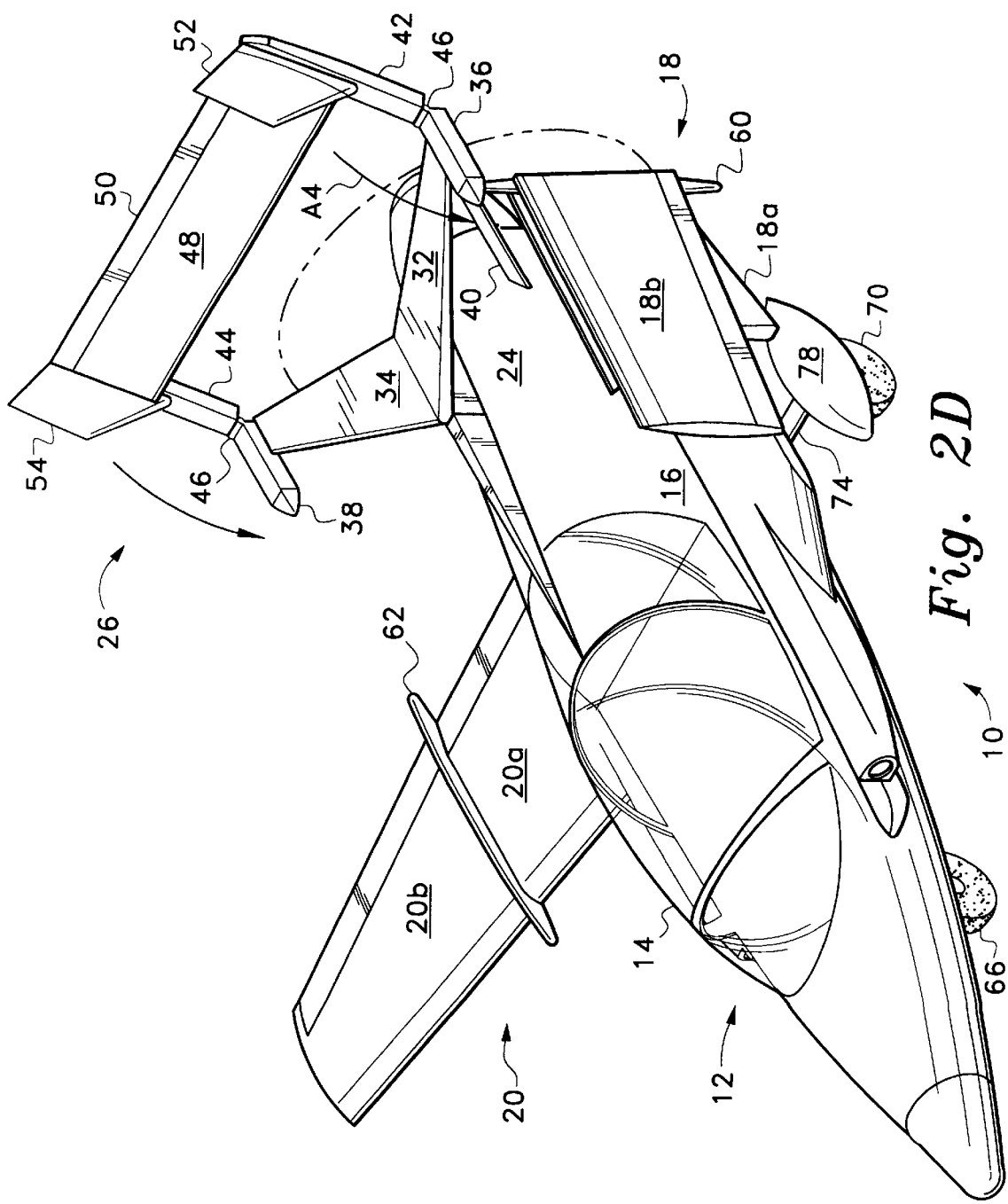
FIG. 2D is a perspective view of the present roadable aircraft showing the first step in folding the empennage of the aircraft, after the wings have been folded against the fuselage.

FIG. 2D illustrates the first step in the process of folding the empennage assembly 26. An attachment fitting having two spaced apart pins (not shown in FIG. 2D, but similar to the fitting 56 illustrated in detail in FIG. 12) is used to form the hinge attachment point 46 securing each rear tail boom portion 42 and 44 to their respective forward portions 36 and 38. The lower pin is withdrawn from its mating passages in each fitting, with the upper pin acting as a hinge pin 46. The rear portion of the empennage assembly 26, including the horizontal stabilizer 48, elevator 50, and both vertical fins 52 and 54, is then raised upwardly and forwardly, pivoting about the hinge pins 46 in each tail boom 36 and 38, as indicated by the folding direction arrows A4 at each tail boom 36 and 38. The folding may be accomplished using powered means, such as an electric motor or actuator, if desired.

Figure 2E:
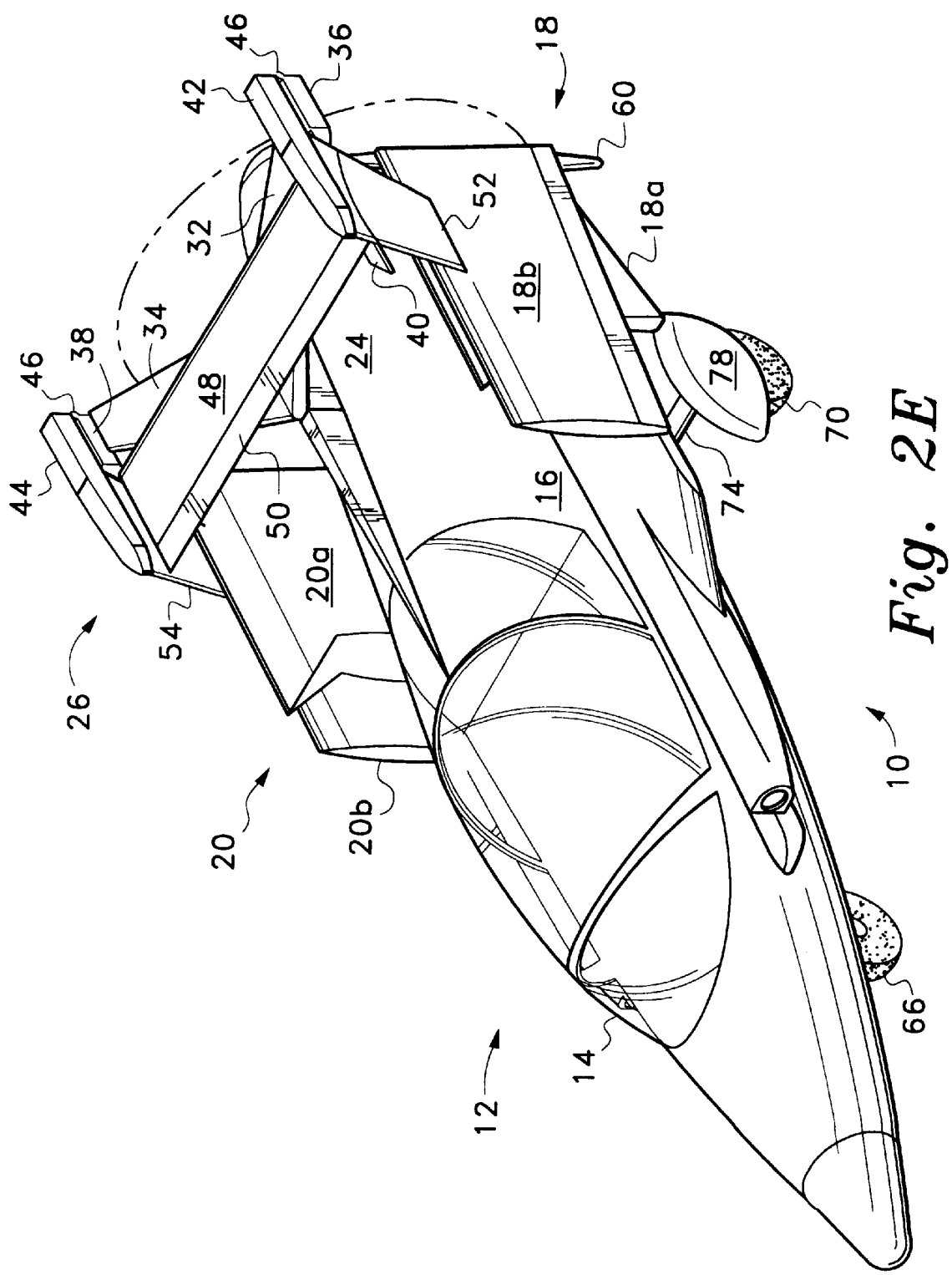
FIG. 2E is a perspective view of the present roadable aircraft showing the final step in folding the empennage of the aircraft, to complete conversion to ground operation or storage.

The present roadable aircraft 10, when its aerodynamic surfaces are completely folded for surface travel, will have an appearance as shown in FIG. 2E. The double folding of the two wing panels 18 and 20 provide a maximum vehicle width which is well within the maximum permissible width in any U.S. jurisdiction, thus enabling the vehicle to be licensed for normal road and highway use in any state in the U.S. The folding of the empennage assembly 26 over the rear of the craft, with the two vertical surfaces 52 and 54 immediately outboard the two wing panels 18 and 20, as shown in FIG. 2E, provide for efficient road use and compact storage of the vehicle, with all of the flight components being positively locked in their stored positions.

Figure 3:
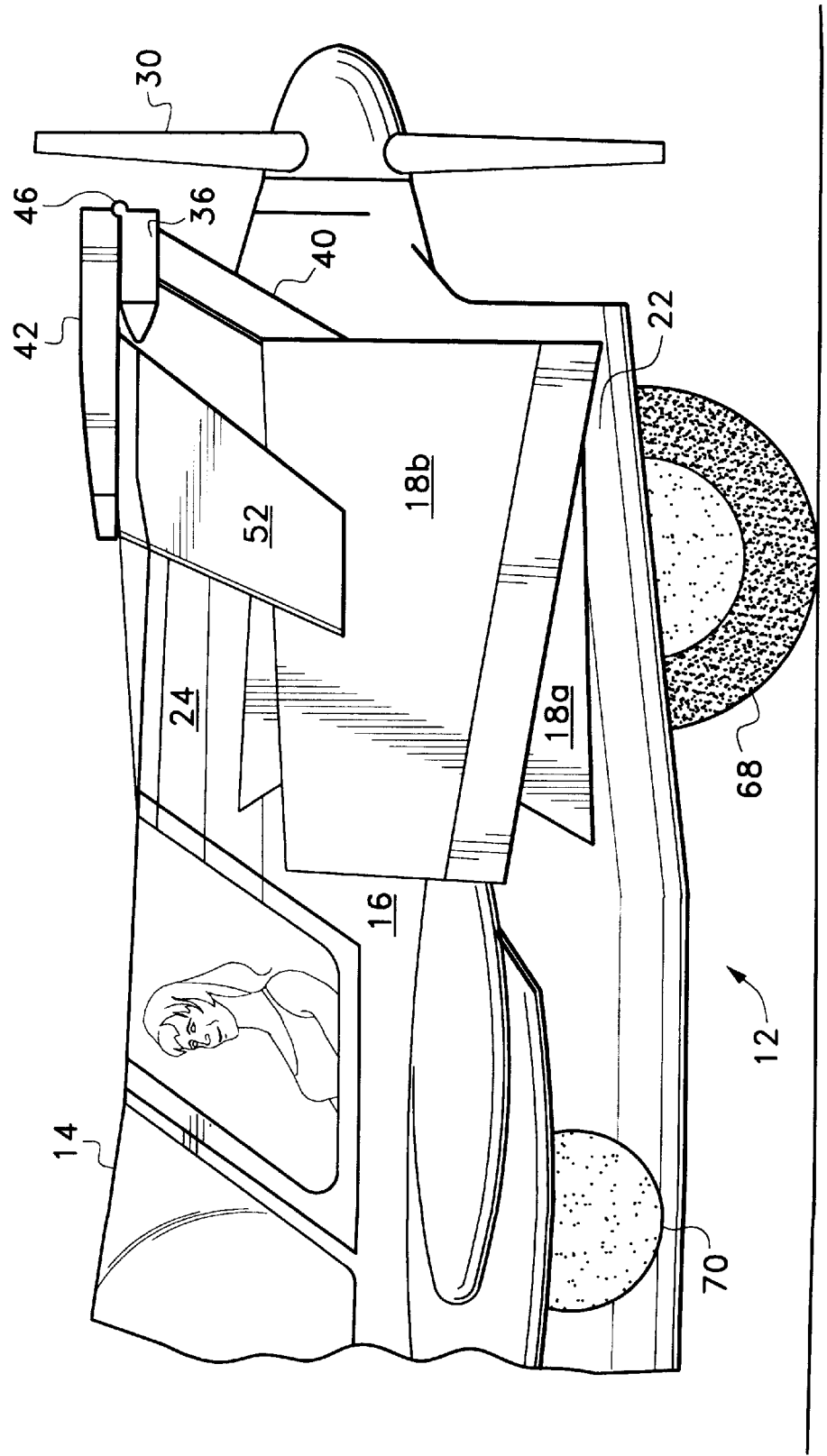
FIG. 3 is a partial left side elevation view showing the rear of the craft with wings and empennage completely folded.
Figure 4:
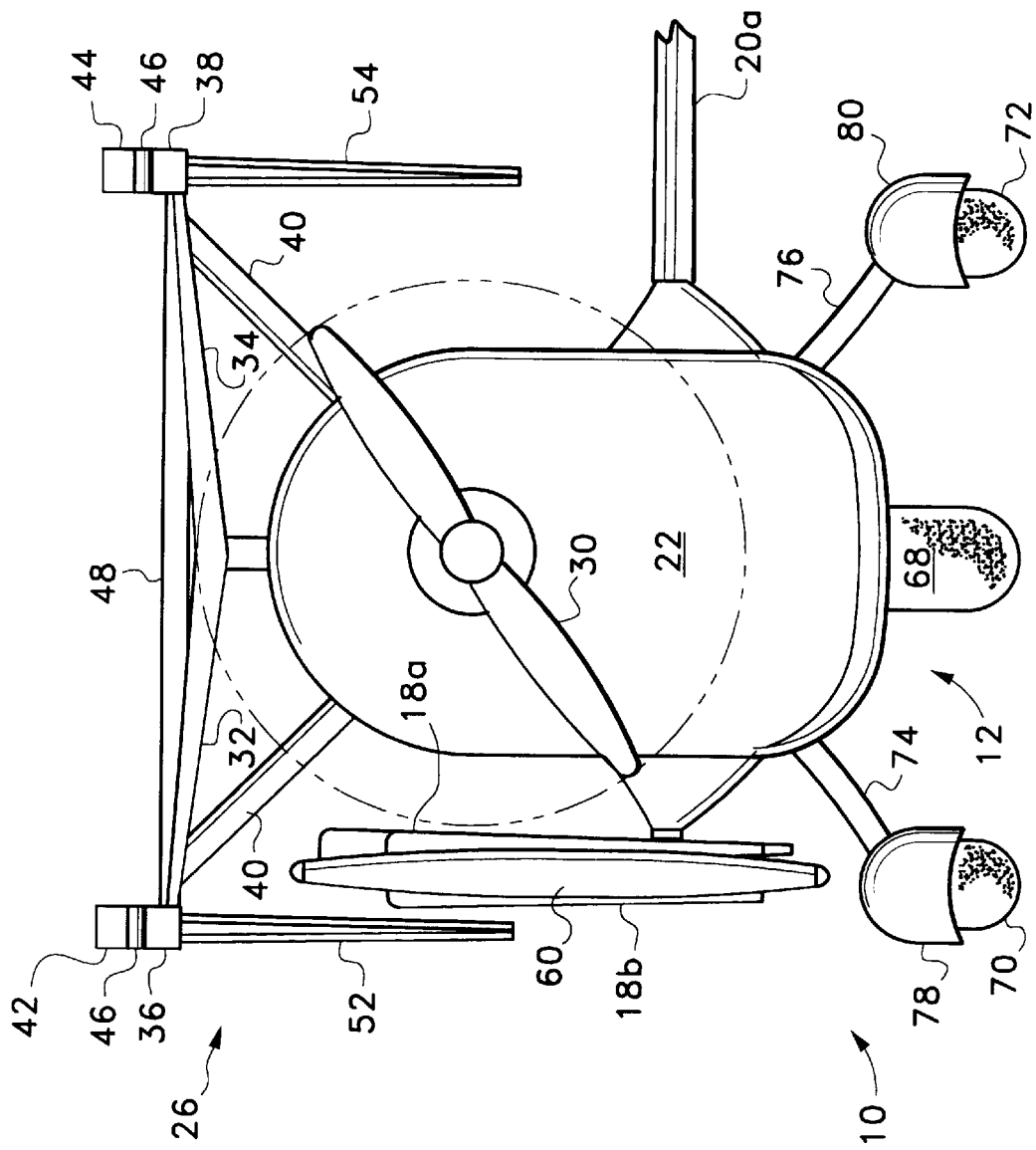
FIG. 4 is a rear elevation view of the present roadable aircraft, showing the relationship of the folded components.

FIGS. 3 and 4 respectively provide side elevation and rear elevation views of the present roadable aircraft 10 with all flight components folded, for surface transportation. As noted above, the two wing panels 18a and 18b (and 20a and 20b, when folded) rest sufficiently close to the fuselage or body structure 12, to lie within the span of the two vertical surfaces 52 and 54 when they are folded forwardly and downwardly, as illustrated in FIGS. 2E, 3, and 4. The resulting configuration provides an extremely compact width, capable of fitting easily in a standard garage or parking space. The forward and downward folding of the two vertical surfaces 52 and 54, provide a folded height for the vehicle 10 which is very little higher than the height of the fuselage or body structure 12, to provide clearance for garage storage.

Figure 5:
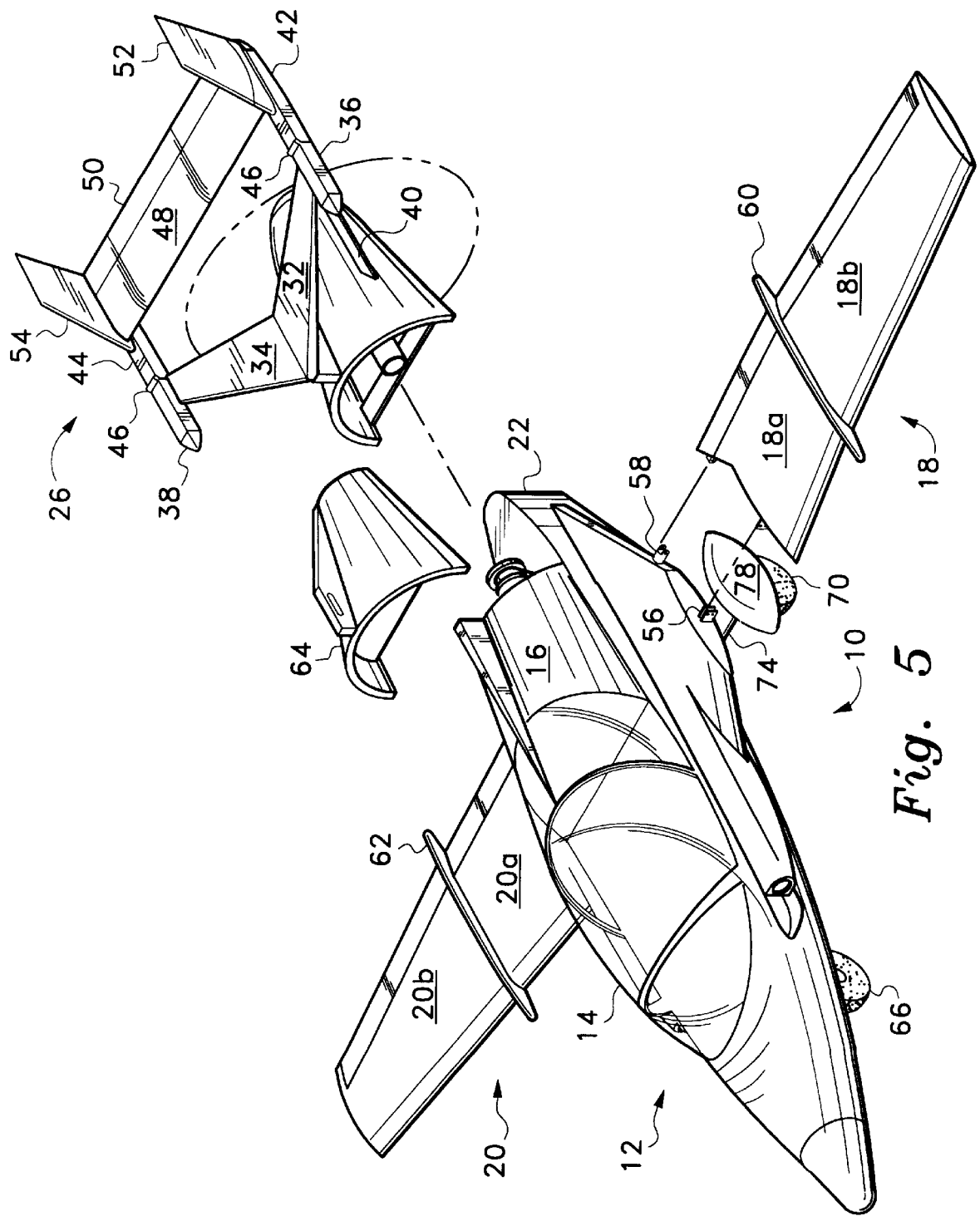
FIG. 5 is an exploded perspective view of the present craft, showing the removal of flight components and installation of a rear fairing and/or baggage compartment for ground use.

FIG. 5 illustrates an alternative means of converting the present roadable aircraft 10 for surface use, by removing the various flight components therefrom. As each wing panel 18 and 20 is pivotally secured to the fuselage or body structure 12 by only a single U-joint type attachment when the wings 18 and 20 are folded, a single wrist pin or other structural pin or attachment may be removed from each U-joint or its accompanying structure, thereby allowing each of the wings 18 and 20 to be removed completely from the fuselage or body portion 12 of the craft 10. All flight controls include automatic connections and disconnects, e. g., by means of the structure disclosed in FIG. 12 of the drawings and discussed further below. Preferably, all fuel is carried within the body portion 12 of the craft 10, which body or fuselage 12 also includes all wheels and landing gear. Thus, the wings 18 and 20 are each relatively light in weight for ease of removal, and very few additional components need be disconnected and connected when the wings 18 and 20 are removed and installed.

The entire empennage assembly 26 is also readily removable from the present roadable aircraft 10. The upper rear portion 24 of the body structure 12 is quickly removable from the body 12, with the various flight controls including automatic disconnect structure as shown in FIG. 12, or other suitable automated means. The propeller 30 and shaft are also easily removable by a lateral pin through mating splined shaft components, or other suitable means. A baggage compartment 64 may be installed in place of the upper rear portion 24 of the body 12 for ground use, if so desired.

FIG. 6 further illustrates the various quickly removable and installable flight components shown in FIGS. 1 through 5 and discussed in detail above, and also clearly shows the rhombus pattern of the wheels and landing gear of the present roadable aircraft 10. In FIG. 6, the various flight components are shown in broken lines, in order to make distinct the fuselage or body structure 12 from the flight components. (It will be understood that the lower rearward portion or lower tail cone of the body structure 12 remains with the forward and central portions of the body structure 12 when the flight components are removed, but is shown in broken lines due to the removability of the empennage assembly 26 thereabove.)

FIG. 6 also illustrates the rhombus pattern landing gear or wheel configuration of the present roadable aircraft 10, as noted above. Rather than placing a wheel at each of four corners of the vehicle, the present craft 10 uses two main wheels disposed along the centerline C of the craft 10. The forward main wheel 66 serves as a steerable nose wheel for the craft 10, and is steered or turned according to a steering control located in the cockpit or interior of the craft 10. (Preferably, a side stick control is used for steering the craft 10 on the surface, with power assist means provided to produce the required forces with the relatively limited movement of the side stick, in comparison to a conventional steering wheel. However, other types of steering controls may be provided as desired, such as a conventional steering wheel or other control.)

The rear main wheel 68 also lies along the centerline C of the roadable aircraft 10. The rear main wheel 68 does not produce any steering or directional guidance, but serves as the single drive wheel for the craft 10. The drive system for the present craft 10 is discussed further below.

The third and fourth wheels comprise a left and a right outboard wheel, respectively 70 and 72, which extend from the central portion 16 of the body structure 12 on struts, respectively 74 and 76. (Left and right wheel fairings 78 and 80 may be provided for streamlining of the left and right outboard wheels 70 and 72, if desired.) These outboard wheels 70 and 72 provide lateral stability for the craft 10 when it is operating on the surface, and also serve as the main landing gear wheels for the craft 10 for takeoffs and landings when the craft 10 is in the flight configuration. The location of the four wheels 68 through 72 results in a rhomboid or diamond shaped wheel layout pattern, which provides excellent longitudinal and lateral stability for the craft 10 while also providing a lightweight and efficient system. Any and all of the above described wheels may be selectively extended or retracted as required, depending upon the specific operation being performed. The retraction means, including the means for individually raising and lowering each of the outboard wheels 70 and 72 for operation on the surface, is discussed further below.

Figure 7:
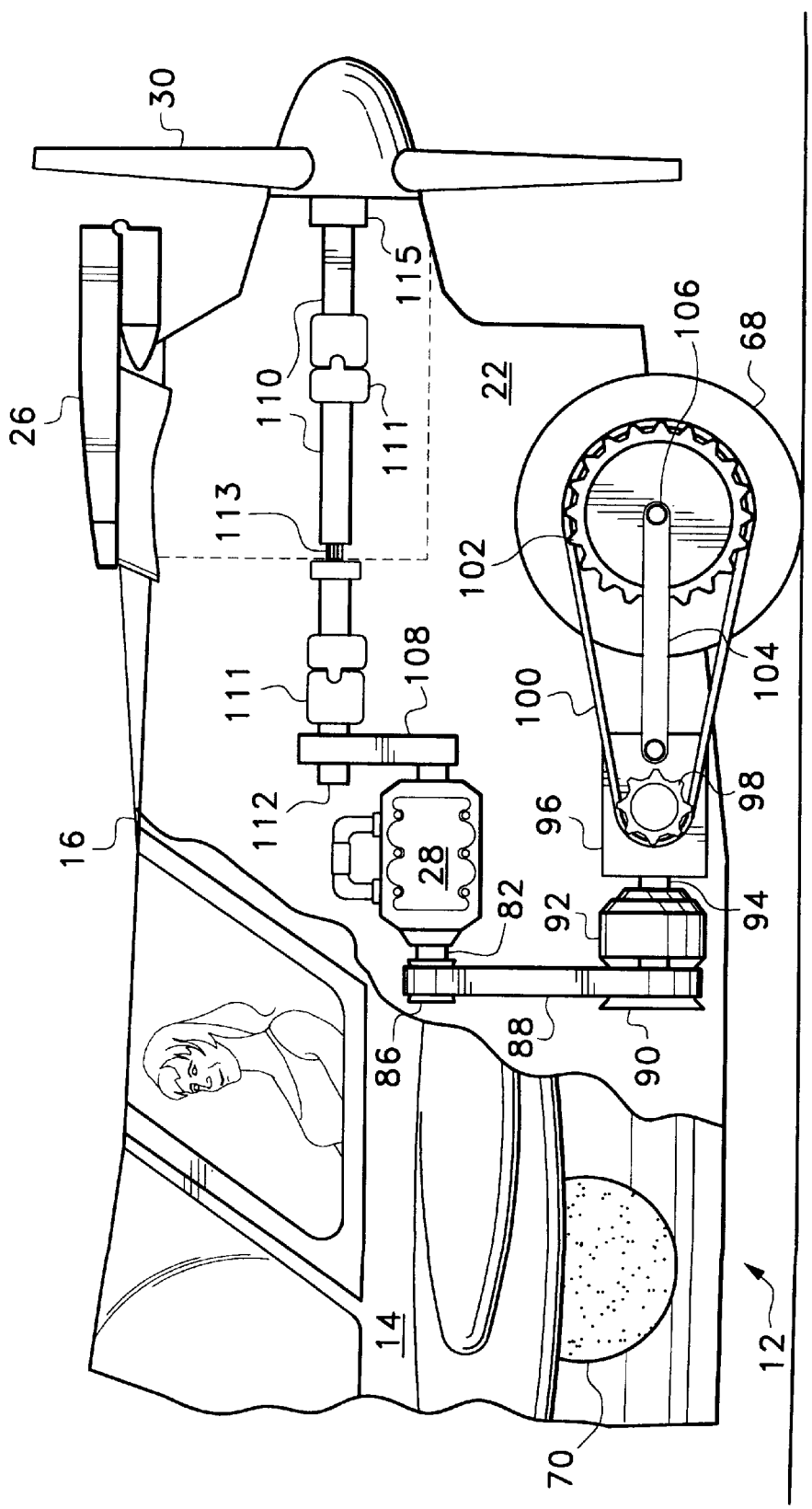
FIG. 7 is a partial side elevation view in section of the rear of the craft, showing details of the powerplant and wheel and propeller drive train.

FIG. 7 is a side elevation view in section of the central and rearward portions 16 and 22 of the fuselage or body portion 12 of the craft, including the engine 28, propeller 30, and drivetrain installation. The engine 28 used in the present roadable aircraft 10 is preferably a multicylinder Otto (four stroke) cycle reciprocating internal combustion engine, having a horizontally opposed cylinder arrangement, i. e., with equal numbers of cylinders arranged horizontally on each side of a central crankshaft. While this configuration describes practically all light aircraft engines, such engines are relatively expensive, and the present roadable aircraft utilizes a Subaru automotive engine having the same layout, but being liquid cooled. Such engines produce on the order of 170 horsepower in normally aspirated form, and are capable of accepting forced air induction for more power. However, other engines may be used alternatively as desired.

Preferably, the engine 28 used to power the present roadable aircraft 10 includes power output shafts at each end thereof, for ease of providing power to the two drive systems (drive wheel 68 and propeller 30) of the present craft 10. Accordingly, the engine 28 includes a first output shaft end 82 used to provide power to the drive wheel 68, and an opposite second output shaft end 84 for providing power to the propeller 30. The first output end 82 includes a pulley 86 which drives a relatively wide belt 88. (Alternatively, a series of smaller belts, or a chain or gear train, etc. could be used to transmit the power from the first output end 82 of the engine 28.)

The belt 88 in turn drives the input pulley 90 of an automatic transmission 92, or input sheaves of a variable ratio transmission. No forward, neutral, or reverse gearing is provided by the transmission 92, but its output shaft 94 drives a gearbox 96 for selecting forward, neutral, and reverse as required. The gearbox 96 has an output sprocket 98 driving a belt or chain 100, which in turn drives the drive wheel input sprocket 102. A trailing link 104 extends between the gearbox 96 and the drive wheel hub 106, to maintain the proper tension on the belt or chain 100.

The opposite, second output shaft 84 of the engine 26 drives a propeller shaft drive belt 108, which in turn drives a propeller shaft 110 extending rearwardly to the rear mounted propeller 30. (It should be noted that the drive wheel and propeller may both be driven from a single output end of the engine by means of a selectable transfer case, power takeoff unit, or other suitable means, if so desired.) The shaft 110 may include one or more U-joints 111, constant velocity joints, or other means to accommodate axial misalignment of the shaft 110. A splined coupling 113 is provided at the disconnect point of the shaft 110, essentially in planar alignment with the forward edge of the removable empennage group 26, shown in broken lines in FIG. 7. Additional components, e. g., a propeller hub bearing 115, may be provided in the propeller drive shaft 110 or system. The appropriate drive ratio between the engine 28 and propeller 30 is achieved by means of the input and output pulley diameters at each end of the propeller shaft drive belt 108.

Selection of output power from the engine 28 to either the transmission 92, to drive the drive wheel 68, or to the propeller shaft 110, to drive the propeller 30, is accomplished by means of a locking hub, e. g., hub 112 at the input end of the propeller shaft 110. (A similar hub, not shown, may be installed at the first output end 86 of the engine 28, or at the input pulley or sheaves 90 of the transmission 92.) Such locking hubs are used in four wheel drive vehicles at the front wheel hubs to select drive power to those wheels, and are capable of handling the torque output to the transmission 92 and propeller shaft 110 of craft 10.

In some cases, it may be preferable to drive both the ground drive wheel and propeller from a single output shaft end of the engine. In such a configuration (not shown in the drawings), an extension shaft may be provided beyond the propeller drive belt or chain mechanism to drive one or more belts, roller chains, etc. which communicate with the drive wheel transmission. A locking hub, similar to the locking hub 112 of FIG. 7, may be used to engage or disengage the transmission belt or chain drive from the extension shaft as required, depending upon whether ground or flight operation is desired. Other configurations (e. g., both the propeller and ground drive wheel output being driven from the transmission, which is in turn driven from the engine, etc.) may be used with the present roadable aircraft, depending upon the specific engine, transmission, and drivetrain configuration adapted for use with the craft.

Figure 8:
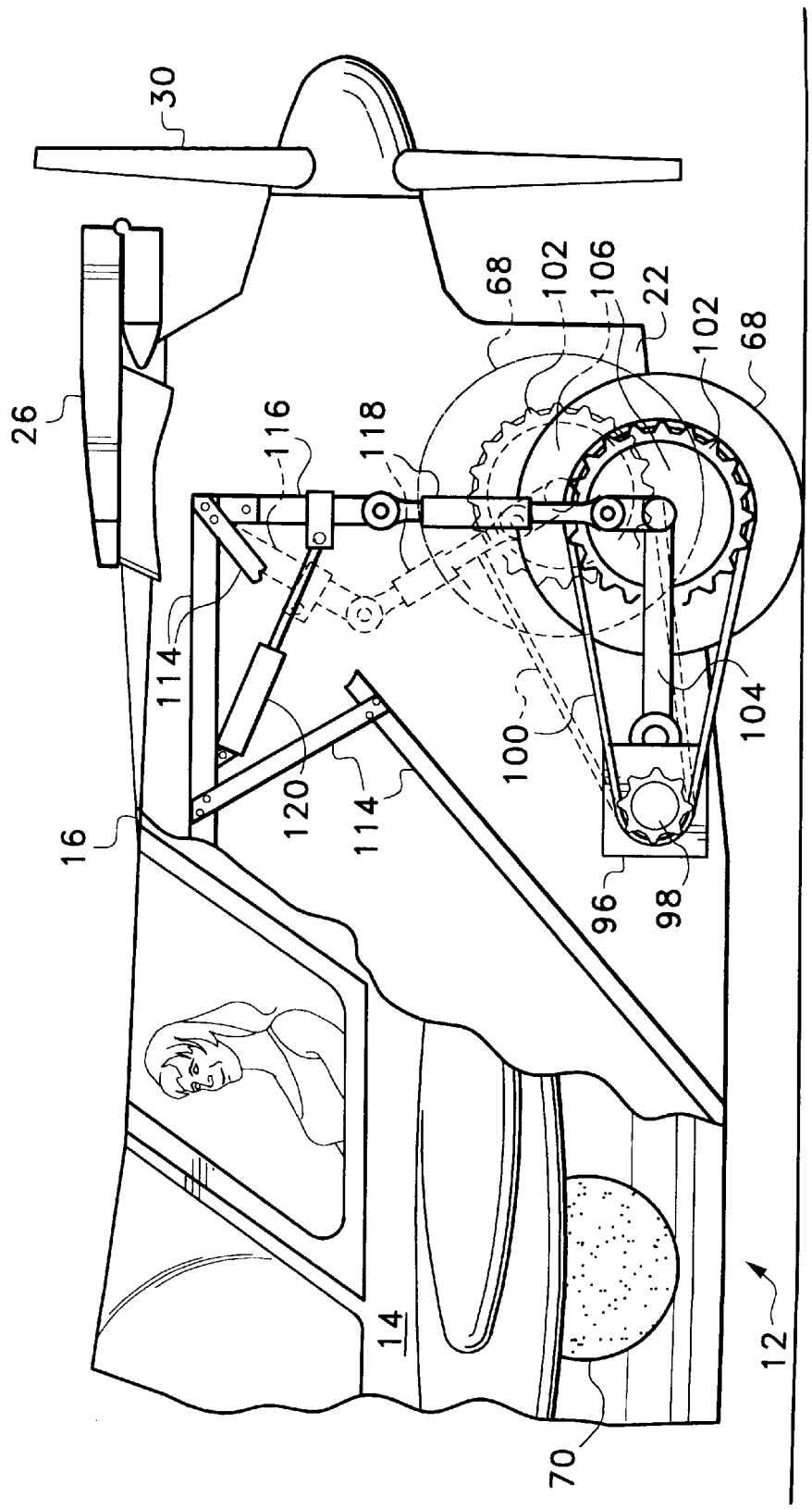
FIG. 8 is a partial side elevation view in section of the rear of the craft, showing details of the rear wheel suspension and retraction system.

FIG. 8 illustrates the rear drive wheel 68 suspension and retraction system used in the present roadable aircraft 10. (The engine 28, transmission 92, propeller drive shaft 110, and other drive components are not shown in FIG. 8, for drawing clarity.) A fixed, rigid framework 114 is used to form the structure of the fuselage or body portion 12 of the craft 10, with the rear drive wheel suspension system being retractably attached thereto. The suspension system comprises a pair of interconnected upper struts 116 and a pair of lower struts 118, with the lower struts 118 each including a resilient suspension member (spring and/or shock absorber strut, etc.) therein. A retraction link 120 comprising a linear actuator, hydraulic cylinder or other suitable actuator extends between a forward portion of the illustrated framework 114 and a point on the interconnected upper struts 116. (While the two lower suspension elements 118 extend downwardly to capture the drive wheel 68 therebetween, and each lower element 118 has an upper strut or element 116 extending upwardly therefrom, it will be seen that only a single upper and lower element 116 and 118 is shown in FIG. 8, due to the side elevational view of FIG. 8.) The resilient suspension members 118 of the lower links provide suspension travel and shock absorption for surface travel using the fuselage or body portion 12 of the present roadable aircraft 10, when the craft 10 is configured for surface travel with the flight components removed. The retraction and extension strut 120 serves to retract the drive wheel 68 for inflight operations, and for takeoffs, landings, and taxiing.

The extended positions of the upper and lower struts or links 116 and 118, the extension and retraction strut 120, and the rear tire 68, are shown in solid lines in FIG. 8, while the retracted positions of the above components 116, 118, and 68 are shown in broken lines. (The extension and retraction strut 120 remains very close to the same linear alignment whether extended or retracted.) It will be seen that the retraction linkage above the lower links 118 remains rigid when the linkage is extended, thus allowing the resilient members 118 of the lower struts to serve their function in absorbing generally vertical motion of the tire or wheel 68 while the craft 10 is operating on the surface. Also, while the extension and retraction linkage for the forward wheel 66 is not shown, it will be understood that a system similar to that described above for the rear drive wheel 68 may be employed to extend and retract the front wheel 66, if so desired.

When the two outboard wheels 70 and 72 are extended, as described further below, they support the craft 10 somewhat behind the center of gravity of the craft, even with the empennage assembly 26 fully extended behind the craft.

Thus, when the outboard wheels 70 and 72 are extended and the rear drive wheel 68 is retracted, the craft 10 rests upon the two outboard wheels 70 and 72 and the steerable nose wheel 66, in the manner of a tricycle gear aircraft, with the rear drive wheel 68 remaining clear of the surface. The drive wheel 68 is retracted to provide sufficient clearance for operations at high angles of attack, as when the aircraft 10 is rotating for takeoff and in the landing flare, when the tail of the craft 10 is relatively close to the underlying runway or other surface.

Figure 9:
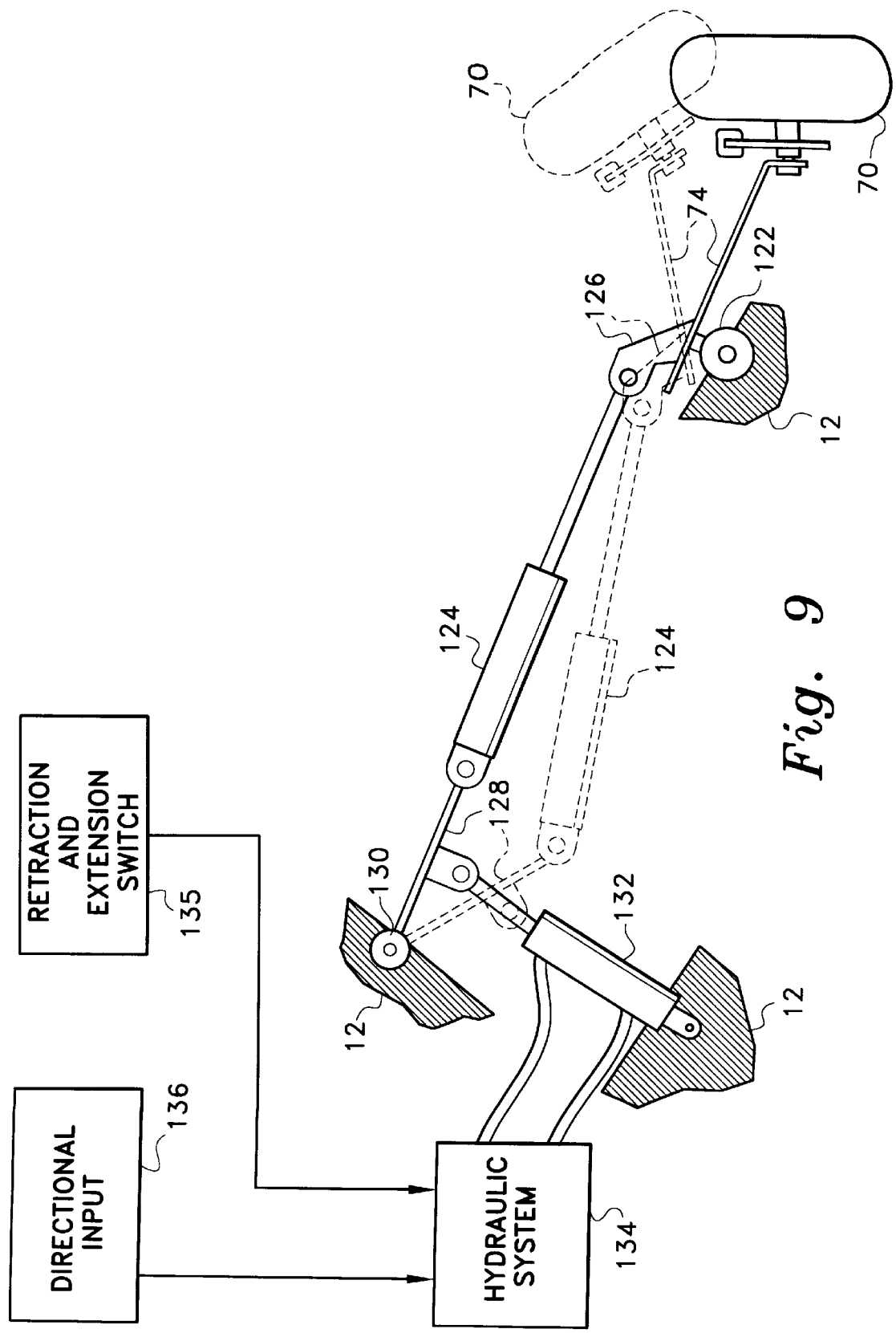
FIG. 9 is a schematic elevation view of one outboard wheel unit, showing the extension and retraction means therefor, for compensating for centrifugal force in turns while on the ground and for partially retracting the outboard wheels for flight.

However, for road or highway operations the drive wheel 68 must be in contact with the underlying surface, for obvious reasons. Thus, the drive wheel 68 may be extended by means of the above described linkage and system, and the outboard wheels 70 and 72 retracted by means of the system described immediately below. FIG. 9 provides a schematic illustration of the left outboard wheel 70 extension and retraction system, with it being understood that the right outboard wheel 72 system is a mirror image of that shown in FIG. 9. The wheel 70 and strut 74 are pivotally mounted to the fuselage or body structure 12 at a lower or outboard hinge or pivot point 122, with a folding or retracting linkage comprising a lower or outboard link and shock absorber 124 extending from an arm 126 on the strut 74, and an upper or inboard link 128 extending to an upper or inboard pivot attachment point 130 in the fuselage or body 12. When the wheel 70 is extended, as shown in solid lines in FIG. 9, the linkage 124 and 128 form a straight line (or may be positioned slightly over center, to provide a solid locking configuration). Thus, all upward forces to the wheel 70 are transmitted essentially straight along the linkage 124 and 128 to the upper or inboard mounting point 130 in the fuselage or body 12, with sudden loads being cushioned by the shock absorber 124. This shock absorber linkage allows the wheel 70 to move resiliently upwardly to accommodate landing loads, etc., to the extent of the travel of the shock absorber 124.

The extension and retraction mechanism for the wheel 70 is provided by a hydraulic strut or linear actuator 132 which has one end affixed to another point in the fuselage or body structure 12, and an opposite second end pivotally affixed to the upper or inboard strut link 128. When a two way hydraulic strut is used as the retraction and extension means for the wheel 70 and leg or strut 74, the hydraulic strut 132 is controlled by a hydraulic system 134, which supplies hydraulic pressure as required to the strut 132. The linear or hydraulic actuator or strut 132 may be operated simultaneously with its opposite member (not shown) to raise and lower the two wheels 70 and 72 simultaneously, in the manner of conventional retractable landing gear systems, by means of a wheel extension and retraction switch 135 which controls output from the hydraulic system 134 to the actuator 132.

Thus, when the retraction and extension switch 135 is raised to retract the wheels 70 and 72, (both using the same actuator 134), hydraulic pressure is applied to the hydraulic cylinder or strut 132 to retract the strut 132, thus causing the system to travel to the position essentially as shown in broken lines in FIG. 9. Moving the switch 135 to extend the wheels 70 and 72, causes the hydraulic system to extend the strut 132 to position the system to appear essentially as shown in solid lines in FIG. 9.

While the simultaneous and collective retraction system described above for the outboard wheels 70 and 72 may be used to retract the wheels 70 and 72 completely into some other structure, such as the inboard portions 18*a* and 20*a* of the two wings 18 and 20, its main function is to extend the two outboard wheels 70 and 72 collectively for use as main wheels for the craft 10 when in an aircraft configuration, and to retract the two outboard wheels 70 and 72 to place the two centerline wheels firmly on the underlying surface when the craft 10 is to be used for surface operations. (This partial retraction is the reason that wheel fairings 78 and 80 are provided for the two outboard wheels 70 and 72.)

In addition to the above described simultaneous retraction and extension of the two outboard wheels 70 and 72, each of the wheels 70 and 72 is independently extendible and retractable relative to the other when traveling on the surface. The hydraulic system 134 also receives input from a directional input device 136, which may comprise a direct linkage from the steering system or steerable nose wheel 66, or a transducer which provides a signal according to nose wheel 66 or other steering deflection, or centrifugal force. This system enables the vehicle 10 to be leaned or banked into turns when operating as a road vehicle on the surface. Normally for surface use, the craft 10 will have its nose and rear drive wheels 66 and 68 extended, and its outboard wheels 70 and 72 retracted at least level with, or slightly above, the plane of the nose and drive wheels 66 and 68. Thus, the craft 10 will rest upon all four of the wheels 66, 68, 70, and 72 in a rhomboid pattern, or will at least rest upon the centerline wheels 66 and 68 and one outboard wheel 70 or 72, with the opposite outboard wheel 70 or 72 remaining very close to the surface.

When the craft 10 is in motion and is driven around a turn, it will naturally tend to lean to the outside of the turn, due to centrifugal force. As an example, if the craft 10 is driven around a right turn, it will tend to lean to the left. The directional input device 136 receives a right turn indication, and provides a signal to the right hydraulic actuator (not shown) to decrease the hydraulic pressure in the right hydraulic strut (not shown). The result will raise or retract the right strut 76, to the inside of the turn. (The position of the right strut 76 would be on the order of the position of the left strut 74 shown in broken lines in FIG. 9.) This provides clearance to the inside of the turn, to enable the craft 10 to be leaned or banked into the turn.

Simultaneously, the directional input device 136 sends a signal to the hydraulic system 134 to apply increased hydraulic pressure to the left actuator 132. This causes the strut 132 to extend, thereby lowering the left wheel 70 to cause the craft 10 to lean to the right and bank into the turn. When the turn is completed and no directional steering input or centrifugal force (depending upon the system) is sensed by the directional input device 136, signals are sent to the hydraulic system 134 to equalize the extension of the two actuators, i. e., the left hydraulic actuator 132 and the right actuator (not shown), and thus their respective left and right wheel struts 74 and 76. It will be seen that operation in a left turn would be the reverse of that described above for a right turn.

A practicable roadable aircraft requires further systems providing for the conversion of operation of the craft from flight condition to road use, and vice versa. One of the convertible systems required is that providing for lateral or yaw control in the air. This is conventionally accomplished using rudder pedals, which have no direct analogy in ground transportation. Accordingly, it is desired that the rudder pedals be ready for use for flight operations, yet be removed from ready access for ground operations, where they would be a hindrance to the conventional throttle and brake pedals used in ground vehicles. Accordingly, the present invention contemplates provision for a left and a right rudder pedal, respectively 138 and 140 (FIG. 13) which may incorporate a toe actuated brake with each pedal, as is conventional in aircraft.

A retraction or retiring mechanism (not shown) is preferably incorporated for the two pedals 138 and 140, with the rudder pedal retraction mechanism preferably being automated along with other automated connection and disconnect elements of the present roadable aircraft. Thus, when it is desired to convert the craft to road use, the rudder pedals 138 and 140 (and their integral toe brake elements) are retracted to a position forward and above the throttle or gas and brake pedals used for ground operations. When the craft is converted for flight, the pedals 138 and 140 are extended downwardly and rearwardly, where they are readily reached by the pilot's feet, as is conventional in aircraft control.

In automobiles or other motorized vehicles used on the surface, throttle linkages are conventionally biased to the throttle closed or idle position by spring means, and constant pressure must be applied in order to hold the throttle at the desired position for operation above idle power settings. However, in aircraft, throttles are conventionally operated by hand and have no spring means, remaining set at the desired position as set by the operator. Accordingly, some means must be provided in the present roadable aircraft 10, for each of the above throttle actuation systems to be used as appropriate, and without interference with one another.

Figure 10:
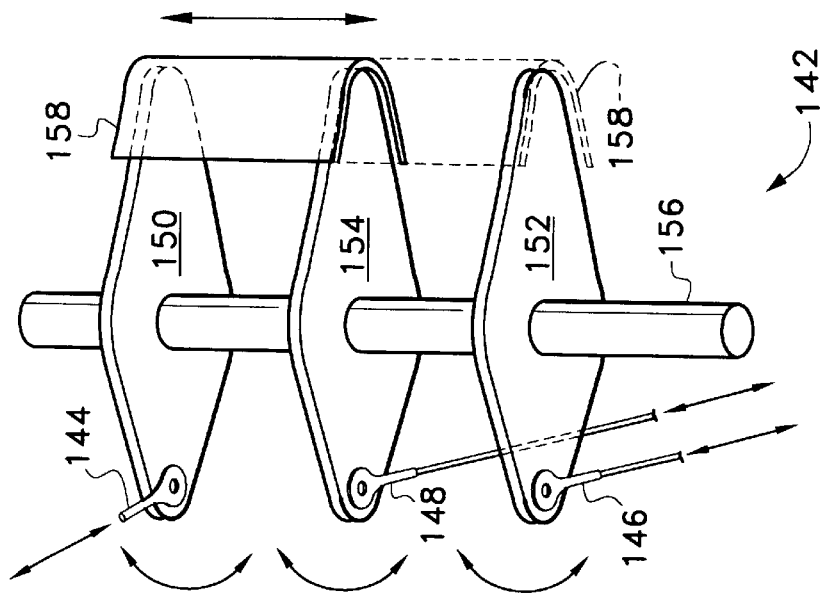
FIG. 10 is a perspective view of the hand and pedal throttle linkage interconnect system to actuate either of the throttle control systems separately for flight or road use.

FIG. 10 of the drawings discloses such means 142, with a hand throttle linkage 144, pedal throttle linkage 146, and engine throttle linkage 148, and a common selective linkage therebetween. Each of the above linkages (pushrod, cable, etc.) is connected to a separate bellcrank, respectively hand throttle crank 150, pedal throttle crank 152, and engine throttle crank 154 centrally disposed therebetween, with each bellcrank 150 through 154 being free to pivot or swivel independently of one another on a common axle or shaft 156. A coupling link 158 is configured to secure either the hand throttle crank 150 or opposite pedal crank 152 to the centrally located engine throttle bellcrank 154. The coupling link 158 may be shifted between a first position in which the upper or hand throttle bellcrank 150 and engine throttle crank 154 are affixed together, or to an alternate second position (broken lines) in which the pedal 152 and engine 154 cranks are affixed together.

When the coupling link 158 is switched to its first position for flight operation, as shown in solid lines in FIG. 10, both the hand throttle bellcrank 150 and engine throttle bellcrank 154 are immovably affixed together, relative to one another. Thus, movement of the hand throttle and its corresponding linkage 144 causes the central engine throttle crank 154 to be moved accordingly, by means of the coupling link 158 securing the two cranks 150 and 154 together. The third, pedal throttle bellcrank 152 is not immovably connected to the other two bellcranks 150 and 154, but is free to swivel independently on the common shaft 156, as the coupling link 158 does not extend sufficiently far as to lock the third bellcrank 152 with the other two cranks 150 and 154. Thus, if pressure is applied to the throttle pedal, no response is achieved from the engine, as the pedal throttle linkage is separated from the engine by the above described linkage.

When the present roadable aircraft 10 is converted to surface operation, the coupling link 158 is switched to its second position, as shown in broken lines in FIG. 10. The coupling link 158 must be moved clear of the first or hand throttle crank 150 in order to capture the pedal throttle crank 152 with the engine throttle bellcrank 154, thus securing the pedal throttle to engine link and freeing the hand throttle bellcrank 150. Pressure applied to the pedal throttle (which may have a throttle return spring at the pedal) actuates the pedal throttle bellcrank 152, which in turn actuates the central engine throttle bellcrank 154 by means of the coupling link 158 in its second position, shown in broken lines.

Figure 11:
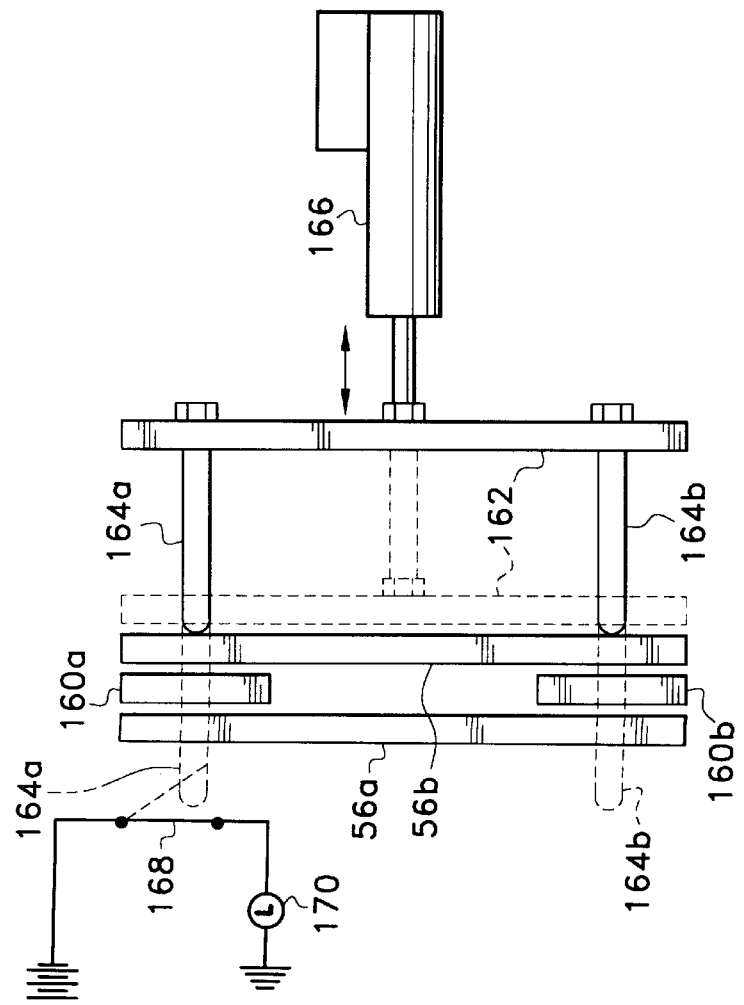
FIG. 11 is an elevation view of the flight component attachment means and annunciator circuitry therefor.

It was noted further above, that the wing and empennage assemblies preferably include some means of automatic connection and disconnection, either for readying the present roadable aircraft 10 for flight or for surface operation, as desired. FIG. 11 discloses such an automatic connection and disconnection means. In FIG. 11, the main spar attachment plates 56*a* and 56*b* of the fuselage or body structure 12 are shown, with the upper and lower wing spar attachment fittings 160*a* and 160*b* shown sandwiched therebetween. (It will be understood that a close tolerance fit is maintained between the two plates 56*a* and 56*b* for the two attachment fittings 160*a* and 160*b*, and that the gaps shown in FIG. 11 are for clarity in the drawing figure.)

A spar pin drive plate 162 includes a pair of spar attachment pins, respectively 164*a* and 164*b*, which are removably installable through cooperating passages through the two spar attachment plates 56*a* and 56*b*, and the corresponding spar attachment fittings 160*a* and 160*b*. A linear actuator 166, or other suitable means, extends and retracts selectively to drive the pins 164*a* and 164*b* through the passages to secure the spar attachment fittings 160*a* and 160*b*, and the spar attachment plates 56*a* and 56*b*, immovably together, or to withdraw the two pins 160*a* and 160*b* from the passages to allow the wing to be separated from the fuselage or body structure. The above described structure may also be used to secure the two rear tail booms 42 and 44 to their respective forward portions 36 and 38, with little modification, e. g., with only a single movable pin, with the upper pin remaining in place as a hinge pintle.

When the linear actuator 166 is extended to drive the two pins 164*a* and 164*b* through the corresponding passages to secure the wing spar to the fuselage structure by means of the spar attachment fittings 160*a* and 160*b* and the two spar attachment plates 56*a* and 56*b*, the spar pin drive plate 162 and the two spar pins 164*a* and 164*b* will appear in the positions shown in broken lines in FIG. 11. The two pins 164*a* and 166*b* extend completely through the spar plates 56*a* and 56*b*, with the nose of one of the pins, e. g., the upper pin 164*a*, closing a normally open electrical switch 168. This switch 168 may be connected to an annunciator light 170, to notify the operator that the pin 164*a* has been completely seated through the two spar attachment plates 56*a* and 56*b*, thus indicating that the wing spar to fuselage attachment is complete and secure. A second switch and annunciator light (not shown, but similar to the switch 168 and light 170) may be installed to detect the retracted position of the linear actuator 166 and its attached drive plate 162 and pins 164*a* and 164*b*, in order to indicate that the spar fittings 160*a* and 160*b* may be withdrawn from the attachment plates 56*a* and 56*b*, for folding or removal of the wing.

Flight control linkages preferably include automatic connection and disconnection means, in order to reduce operator workload when the present craft 10 is converted from its flight configuration for operation on the surface, and vice versa. Such automatic connection means also provide a significant safety factor, in that the operator cannot forget an automated step.

Such an automated control connection means is shown in FIG. 12, and is similar to that used in gliders and other aircraft where the wings are removed from time to time for storage of the aircraft or for retrieval from an off-airport landing. In FIG. 12, a first or drive plate 172 is mounted in the fuselage or body structure at a pivot point 174, with a second or driven plate 176 being mounted on a pivot 178 in the flight component so as to be immediately adjacent to and in contact with the drive plate 172 when the flight component is installed to the body structure in flight configuration. (It will be understood that the two plates 172 and 176 will be in contact with one another when the roadable aircraft 10 is in flight configuration, and are shown slightly separated from one another for clarity in the drawing figure.)

A control input linkage 180*a* (pushrod, cable, etc.) is secured to the first end 172*a* of the first plate 172, with a control output linkage 180*b* secured to the first end 176*a* of the second plate 176. When movement is applied to the control input link 180*a*, e. g., a tensile force to the left in FIG. 12, causing the first plate 172 to rotate in a counterclockwise direction as viewed in FIG. 12, the opposite second end 172*b* of the plate 172 will move to the right, as the plate 172 rotates around the pivot 174. This causes the second plate 176 to rotate counterclockwise about its pivot point 178, as the second end 176*b* of the second plate 176 is pushed to the right by the second end 172*b* of the first plate 172. This causes the opposite first end 176*a* of the second plate 176 to move to the left, thus drawing the control output link 180*b* to the left.

If a flexible cable control input and output link is used, a second control input and output cable (not shown) is secured to the respective second ends 172*b* and 176*b* of the two plates 172 and 176 to provide a closed control loop from control input to control surface. However, the system shown in FIG. 12 is suitable when rigid pushrods are used for the control input 180*a* and output 180*b*. Also, it will be seen that the above described system may be used not only to drive such control surfaces as flaps and ailerons in the wing panels, but may also be used at the interconnect points between the forward and rearward portions of the tail booms and also at the attachment points of the empennage assembly with the remainder of the craft 10, to simplify the conversion of the craft from flight to road operation and vice versa.

The present roadable aircraft 10 also provides a user friendly, intuitive control input system for an operator who is both an experienced airplane pilot and automobile driver. FIG. 13 provides a schematic view of the basic control flight and ground control input system of the present roadable aircraft 10. In FIG. 13, flight control input is achieved by means of a side control stick 182, which control stick 182 is completely separated and divorced from any of the controls for operating the roadable aircraft 10 on the surface. The side stick control 182 is pivotally mounted to an appropriate structure 184 in the cockpit or cabin of the fuselage or body 12 (preferably on the right side, and convenient to the hand of the vehicle operator), and operates in a manner generally like that used in many military aircraft developed in the 1980s and later. The side control stick 182 is connected to the flight control system 186, comprising elevator and aileron control surfaces, using conventional control cables and/or pushrods acting through positive control interconnects, such as that shown in FIG. 12 of the drawings.

Ground steering is accomplished by means of another side stick control 188, which is pivotally mounted at a location which is widely separated from the flight control side stick 182 in the cockpit or cabin of the craft 10. This ground steering control 188 may be mounted to suitable structure 190 to the left side of the cockpit or cabin, opposite the flight control stick 182. By providing two control sticks on opposite sides of the cockpit for flight and ground operations, the entire center of the cockpit or cabin remains clear of large and bulky controls, such as a steering wheel, flight control yoke, etc., thereby providing a relatively unencumbered control area, even though controls are provided for operating in two different mediums. The steering control stick 188 actuates a steering system or controls 192 for the front or nose wheel 66 of the craft 10. As the complete range of motion of the steering control stick 188 is relatively limited, some form of mechanical advantage must be provided for an operator of the present craft 10. This may be accomplished by means of a conventional power steering system, and/or by using the hydraulic system 134 shown schematically in FIG. 9, for actuating the retraction and extension system for the two outboard or lateral wheels 70 and 72.

Nose wheel steering in the flight mode for the present roadable aircraft 10 is achieved by means of the right and left rudder pedals, respectively 138 and 140, with independent toe brakes providing differential braking for the two outboard wheels 70 and 72, as is conventional in most airplanes. The rudder pedals 138 and 140 are preferably located between the throttle and brake pedals which are used for speed control of the present craft 10 when it is in its surface operational configuration. These two pedals 138 and 140 may be retracted (or "retired"), as indicated by their respective positions shown in broken lines in FIG. 13, by suitable means indicated further above. When the pedals 138 and 140 are extended rearwardly, they are disposed closer to the operator than the throttle and brake pedals used for controlling the speed of the craft 10 when in its surface operational configuration. However, when these two pedals 138 and 140 are retracted forwardly and upwardly, they are removed from any position of possible interference with the throttle and brake pedals, thus providing for conventional operation of such throttle and brake pedals for ground operation of the craft 10.

The brake pedal 194 is preferably located to the left of the rudder pedals 138 and 140, and operates brakes on at least the forward and rearward wheels 66 and 68, preferably through conventional hydraulic means. The throttle pedal 196 operates the engine throttle by means of an engine throttle link 148 (FIG. 10), through a hand throttle and throttle pedal interconnect and lockout means 142, disclosed in detail in FIG. 10 and discussed further above. When the craft 10 is in its ground or surface operational configuration, the throttle pedal 196 is connected to the engine linkage by means of the pedal and hand throttle interconnect and lockout 142, with the hand throttle 198 being automatically locked out of operation. However, when the present roadable aircraft 10 is configured for flight operation, the interconnect and lockout 142 automatically disconnects the throttle pedal 196, and automatically connects the hand throttle 198 to the engine by means of the hand throttle link 144. Thus, when the craft 10 is configured for flight, the hand throttle 198 is operational, and functions conventionally, with the pedal throttle being completely disconnected from operation.

Operation of the present roadable aircraft 10 is thus at least somewhat intuitive for a person trained in the operation of both airplanes and automobiles. When the craft 10 is in its surface operational configuration, the operator will operate the throttle pedal 196 (and perhaps also the brake pedal 194) with the right foot, with the two rudder pedals being retracted to remain clear of the operator's feet. (The brake pedal 194 may be actuated by the operator's left foot, if so desired.) Steering is accomplished by the left hand of the operator, using the steering control stick 188 disposed to the left side of the cockpit or cabin.

When the craft 10 is converted to flight configuration, the rudder pedals 138 and 140 are extended rearwardly, toward the operator, who actuates the two rudder pedals 138 and 140 in the conventional manner for most light airplanes. At the same time, the operator's left hand drops from the steering control stick 188 to the hand throttle 198 located generally below but adjacent the steering control stick 188, with the operator's right hand being raised to the flight control stick 182. The control configurations for both ground and flight operations are essentially intuitive, with very few, if any, new motions or operations being required of the operator to learn. While the steering control stick 188 is unlike a steering wheel, its operation is nevertheless somewhat intuitive, in that motion to one side results in a steering input in that direction, e. g., pushing the stick 188 toward the left, results in a left turn, just as a left input to the flight control stick 182 results in a left bank when the craft 10 is in flight.

FIG. 11, discussed further above, illustrates an electrical switch and annunciator light means providing a positive indication of the secure attachment (or complete removal) of flight components to and from the body structure of the present roadable aircraft 10. FIG. 14 shows a schematic view of such a system, in combination with starter lockout means to preclude the starting of the engine of the craft unless all systems are secure for either flight or surface operation. (The roadable aircraft 10 preferably includes engine starter means 200, e. g., an electric starter motor and Bendix starter engagement apparatus, for starting the engine 28 whether the craft is in flight or surface operation configuration.)

In FIG. 14, a series of interconnect switches are provided at each of the critical points of assembly of flight components to the fuselage or body structure 12. Such a group of interconnect safety switches must provide for indications of safe conditions for flight, as well as providing indications that the vehicle is ready for ground operations (i. e., rudder pedals retracted, throttle pedal activated and hand throttle disconnected, etc.) Accordingly, two separate switches are provided to indicate the position or configuration of each component, with switches to the left side of FIG. 14 indicating airworthy configuration when closed, and corresponding switches (each using the same reference numerals as the corresponding switch to the left, but having an "a" suffix). Alternatively, each of the switches could comprise a double throw unit, so that a single switch could provide indications for both configurations of a given component of the roadable aircraft 10.

FIG. 11 discloses an example of such an interconnect switch 168 for the left wing spar attachment assembly 56, with the left wing spar interconnect switch 168 also being indicated in FIG. 14, with a left wing spar disconnect switch 168a (for the surface configuration) being shown to the right side of FIG. 14. Similar switches and circuitry are provided for other critical assembly points in the present roadable aircraft structure, e. g., opposite right wing spar interconnect and disconnect switches 202 and 202a; left and right tail boom interconnect and disconnect switches 204, 204a, and 206, 206a (additional switches, not shown, may be provided at critical attachment points for the entire empennage assembly); rudder pedal interconnect and disconnect switches (or extension and retirement switches) 208 and 208a; landing gear interconnect and disconnect (or extension and retraction) switches 210 and 210a (which may involve two switches for each of the four wheels, for determining the retracted or extended position of the wheels 66, 68, 70, and 72, for flight or surface operation); and throttle interconnect and disconnect switches 212 and 212a (actuated by the assembly illustrated in FIG. 10), to indicate the activation or deactivation of the throttle pedal 196 and hand throttle 198. Further switches for providing an indication of the status of other components critical to flight or surface operation, may be provided in addition to those described above, e. g., wing status indicator switches for outboard wing panels, etc.

Each of the above switches 168, 168*a* and 202, 202*a* through 212, 212*a* are connected to an annunciator panel 214, which contains a series of lights corresponding to each of the above described interconnect switches 168, 168*a* and 202, 202*a* through 212, 212*a*, e. g., the light 170 for the left wing spar interconnect assembly 56 and switch 168, shown in detail in FIG. 11. The lights (and/or an audible warning means, not shown) are preferably wired in parallel with each of the above described interconnect switches 168, 168*a* and 202, 202*a* through 212, 212*a*, in order that the system is still functional even in the event of a burned out bulb or the like.

However, each of the circuits for the interconnect switches 168, 168*a* and 202, 202*a* through 212, 212*a* is preferably wired in series through a starter lockout circuit switch 216, which must be activated or closed in order to allow the engine starter 200 to function. Thus, if any one of the interconnect switches 168, 168*a* and 202, 202*a* through 212, 212*a* is still open after the craft 10 is converted to flight configuration, the engine starter 200 will not function. All of the above described switches 168, 168*a* and 202, 202*a* through 212, 212*a*, and any others deemed important or essential to the safe operation of the present roadable aircraft 10, must be closed in order to complete the series circuit which includes the starter lockout means 216.

It will be noted that the closure of one set of switches, e.g., switches 168 and 202 through 212, would enable the starter lockout circuit switch 216 to be closed, thus enabling the starter motor 200 to be activated by the starter switch 218. However, an additional safety precaution is provided by means of a conversion switch 220, which must be switched to one of two positions, i. e., either flight or surface configuration. Thus, even if all of the switches 168 and 202 through 212 are closed, and all of the switches 168*a* and 202*a* through 212*a* are open, the starter motor 200 could still not be engaged until the conversion switch 220 is selected to the proper operational mode, i. e., the flight mode, in the present example. Operation in the ground or surface configuration requires closure of all of the switches 168*a* and 202*a* through 212*a*, and selection of the ground configuration or mode with the conversion switch 220, before the starter motor 200 can be actuated. The result is a system which cannot be circumvented, and which requires the craft 10 to be absolutely in either the flight or the ground configuration before the engine can be started, with no partially converted component configurations being permitted.

The present roadable aircraft 10 is converted to an airworthy condition as described further above, by installing the left and right wing panels 18 and 20, and empennage assembly 26, to the fuselage or body structure 12. (The wings 18 and 20 and empennage assembly 26 need only be unfolded, if they are still foldably attached to the body structure 12.) The above described switch means provides an indication that all components (including rudder pedal extension, throttle interconnect, etc.) are in an airworthy configuration. The wheels are also positioned for flight operations, by extending the two outboard wheels 70 and 72, and retracting the rear drive wheel 68. The propeller 30 is also installed, or engaged by means of the locking hub 112, if installed.

Once the craft 10 is completely and securely configured for flight operations, each of the annunciator lights of the panel 214 will be illuminated, and the operator may engage the starter. The craft 10 then functions as an aircraft, with lateral or yaw input being controlled by the rudder pedals 138 and 140. Differential braking may be used on the surface by means of the conventional brakes of the rudder pedal system shown generally in FIG. 13. Pitch and roll are preferably controlled by a side control stick, as shown in FIG. 13 (or alternatively, a center stick, control yoke, or other aircraft flight control means). A hand throttle is used to control engine power, with the pedal throttle used for ground operations, being disconnected by means of the throttle interconnect linkage shown in FIG. 10.

After the flight has been completed, the roadable aircraft 10 may be reconfigured for surface operation essentially by reversing the steps performed for conversion to flight operation. The rear drive wheel 68 is extended, and the two outboard wheels 70 and 72 are partially raised to place essentially the entire weight of the craft 10 on the two centerline wheels 66 and 68, with the two outboard wheels 70 and 72 preventing excessive leaning of the craft 10. The wing panels 18 and 20 and empennage assembly 26 may be folded as described further above, or may be removed completely from the body structure 12 as desired. The locking hub 112 is unlocked to disengage the propeller 30, with the propeller 30 being removable if so desired. The rudder pedals 138 and 140 are retired and the throttle linkage switched to disconnect the hand throttle and connect the throttle pedal, to complete the conversion.

In summary, the present roadable aircraft 10 provides a much needed advance in personal transportation, responding to the need for ground transportation when the general aviation pilot or traveler arrives at a destination, or when weather prematurely terminates a flight short of the destination. With the present roadable aircraft 10, the operator need only land at the destination or other appropriate location and reconfigure the craft for ground or surface operation in a few simple steps requiring no more than a few minutes time. The operator may then operate the fuselage or body structure 12 as a road vehicle, either carrying the flight component with the vehicle, or leaving them behind at the landing site if a return to the landing site is anticipated.

The craft 10 is made ready for flight, for continuation of the trip or for return to the home field, essentially by reversing the steps of the conversion procedure for converting the craft 10 from flight configuration to ground configuration. The versatility of the present roadable aircraft 10 provides a long sought solution for general aviation aircraft owners, pilots, and travelers, which will do much to maximize personal transportation efficiency.

It is to be understood that the present invention is not limited to the sole embodiment described above, but encompasses any and all embodiments within the scope of the following claims.

I claim:

1. A roadable aircraft having a configuration as follows:
a body structure for carrying at least one person therein;
said body structure including a forward portion, a central portion, and a rearward portion with an upper structure, with at least one powerplant installed in said central portion thereof;
a left and an opposite right wing panel removably affixed to said central portion of said body structure;
an empennage assembly removably affixed to said rear portion of said body structure;
said empennage assembly comprising a left and a right flight surface extending from said upper structure of said rear portion of said body structure, with a left and a right tail boom extending rearwardly respectively from each said flight surface;
each said tail boom having a rearward portion, with a horizontal stabilizer and elevator permanently affixed between said rearward portion of each said tail boom;

said rearward portion of each said tail boom further having a vertical flight surface extending upwardly therefrom; and a propeller removably affixed to said rearward portion of said body structure, with said propeller revolving in a plane between said left and right flight surface and said horizontal stabilizer.

2. The roadable aircraft according to claim 1, including:

an articulated folding mechanism attaching each said wing panel to said body structure, with each said folding mechanism comprising means for rotating each respective said wing panel about a spanwise axis and for folding each said wing panel rearwardly and generally parallel to said body structure when in a folded configuration;

each said wing panel further including an inboard portion, an outboard portion, and an intermediate folding axis therebetween, with said intermediate folding axis comprising means for folding said outboard portion to lie adjacent said inboard portion when in a folded configuration; and each said tail boom including hinge means therein for folding said empennage assembly upwardly and forwardly to lie over said rearward portion of said body structure when in a folded configuration.

3. The roadable aircraft according to claim 1, including a baggage compartment removably installable to said upper structure of said rearward portion of said body structure when said empennage assembly is removed therefrom.

4. The roadable aircraft according to claim 1, wherein said at least one powerplant comprises a horizontally opposed, multicylinder, four stroke reciprocating engine.

5. The roadable aircraft according to claim 1, including at least one drive wheel, with said at least one powerplant including a first and an opposite second output shaft, with said first output shaft being alternately and selectively engageable to drive said drive wheel and said second output shaft being alternately and selectively engageable to drive said propeller.

6. The roadable aircraft according to claim 5, including an automatic transmission for driving said drive wheel from said at least one powerplant.

7. The roadable aircraft according to claim 1, including a rhomboid pattern wheel configuration comprising a single forwardly disposed wheel for steering during surface operation, a single rearwardly disposed drive wheel, and a left and an opposite right outboard wheel, with said forwardly disposed wheel and said rearwardly disposed wheel being located along the centerline of said body structure.

8. The roadable aircraft according to claim 7, including means for at least partially retracting each said wheel.

9. The roadable aircraft according to claim 7, including means for individually extending said left and said right outboard wheel for counteracting centrifugal force effects when turning during surface operation.

10. The roadable aircraft according to claim 1, including starter means for said at least one powerplant and starter lockout means for preventing actuation of said starter means when at least each said wing panel and said empennage assembly are incompletely secured.

11. The roadable aircraft according to claim 1, including:

a flight control system, including a side mounted flight control stick and a left and a right rudder pedal for operating flight controls during flight operations, and a hand throttle for controlling said powerplant during flight operations; and a ground control system, including a side mounted steering control stick for steering during surface operations, and a brake pedal and a throttle pedal for controlling speed during surface operations.

12. A roadable aircraft having a configuration as follows:

a body structure for carrying at least one person therein;

said body structure including a forward portion, a central portion, and a rearward portion with an upper structure, with at least one powerplant installed in said central portion thereof;

a left and an opposite right wing panel;

an articulated folding mechanism attaching each said wing panel to said body structure, with each said folding mechanism comprising means for rotating each respective said wing panel about a spanwise axis and for folding each said wing panel rearwardly and generally parallel to said body structure when in a folded configuration;

each said wing panel further including an inboard portion, an outboard portion, and an intermediate folding axis therebetween, with said intermediate folding axis comprising means for folding said outboard portion to lie adjacent said inboard portion when in a folded configuration;

an empennage assembly including a left and a right tail boom extending from said rear portion of said body structure; and each said tail boom including hinge means therein for folding said empennage assembly upwardly and forwardly to lie over said rearward portion of said body structure when in a folded configuration.

13. The roadable aircraft according to claim 12, wherein said empennage assembly comprises a left and a right flight surface extending from said upper structure of said rear portion of said body structure, with said left and said right tail boom extending rearwardly respectively from each said flight surface;

each said tail boom having a rearward portion, with a horizontal stabilizer and elevator permanently affixed between said rearward portion of each said tail boom; and said rearward portion of each said tail boom further having a vertical flight surface extending upwardly therefrom.

14. The roadable aircraft according to claim 12, wherein at least each said wing panel and said empennage assembly are removably secured to said body structure.

15. The roadable aircraft according to claim 14, including a baggage compartment removably installable to said upper structure of said rearward portion of said body structure when said empennage assembly is removed therefrom.

16. The roadable aircraft according to claim 12, wherein said at least one powerplant comprises a horizontally opposed, multicylinder, four stroke reciprocating engine.

17. The roadable aircraft according to claim 12, including at least one drive wheel and a propeller, with said at least one powerplant including a first and an opposite second output shaft, with said first output shaft being alternately and selectively engageable to drive said drive wheel and said second output shaft being selectively engageable to drive said propeller.

18. The roadable aircraft according to claim 17, including an automatic transmission for driving said drive wheel from said at least one powerplant.

19. The roadable aircraft according to claim 12, including a rhomboid pattern wheel configuration comprising a single forwardly disposed wheel for steering during surface operation, a single rearwardly disposed drive wheel, and a left and an opposite right outboard wheel, with said forwardly disposed wheel and said rearwardly disposed wheel being located along the centerline of said body structure.

20. The roadable aircraft according to claim 19, including means for at least partially retracting each said wheel.

21. The roadable aircraft according to claim 19, including means for individually extending said left and said right outboard wheel for counteracting centrifugal force effects when turning during surface operation.

22. The roadable aircraft according to claim 12, including starter means for said at least one powerplant and starter lockout means for preventing actuation of said starter means when at least each said wing panel and said empennage assembly are incompletely secured.

23. The roadable aircraft according to claim 12, including:
a flight control system, including a side mounted flight control stick and a left and a right rudder pedal for operating flight controls during flight operations, and a hand throttle for controlling said powerplant during flight operations; and
a ground control system, including a side mounted steering control stick for steering during surface operations, and a brake pedal and a throttle pedal for controlling speed during surface operations.

24. A roadable aircraft having a configuration as follows:
a body structure for carrying at least one person therein, including a forward portion, a central portion, and a rearward portion, and at least one powerplant installed therein;
a left and an opposite right wing panel, each foldably and removably attached to said body structure;
an empennage assembly, foldably and removably attached to said body structure;
drive wheel means for propelling said body structure during ground operation, and a propeller; and
said at least one powerplant having a first output shaft and an opposite second output shaft, with said first output shaft selectively communicating with said drive wheel means for surface operation and said second output shaft alternately selectively communicating with said propeller for flight operation.

25. The roadable aircraft according to claim 24, including:
an articulated folding mechanism attaching each said wing panel to said body structure, with each said folding mechanism comprising means for rotating each respective said wing panel about a spanwise axis and for folding each said wing panel rearwardly and generally parallel to said body structure when in a folded configuration;
each said wing panel further including an inboard portion, an outboard portion, and an intermediate folding axis therebetween, with said intermediate folding axis comprising means for folding said outboard portion to lie adjacent said inboard portion when in a folded configuration;
said empennage assembly including a left and a right tail boom extending from said rear portion of said body structure; and
each said tail boom including hinge means therein for folding said empennage assembly upwardly and forwardly to lie over said rearward portion of said body structure when in a folded configuration.

26. The roadable aircraft according to claim 24, wherein said empennage assembly comprises a left and a right flight surface extending from said upper structure of said rear portion of said body structure, with said left and said right tail boom extending rearwardly respectively from each said flight surface;
each said tail boom having a rearward portion, with a horizontal stabilizer and elevator permanently affixed between said rearward portion of each said tail boom; and
said rearward portion of each said tail boom further having a vertical flight surface extending upwardly therefrom.

27. The roadable aircraft according to claim 26, including a baggage compartment removably installable to said upper structure of said rearward portion of said body structure when said empennage assembly is removed therefrom.

28. The roadable aircraft according to claim 24, wherein said at least one powerplant comprises a horizontally opposed, multicylinder, four stroke reciprocating engine.

29. The roadable aircraft according to claim 24, wherein said drive wheel means comprises at least one drive wheel, with said at least one powerplant including a first and an opposite second output shaft, with said first output shaft being alternately and selectively engageable to drive said drive wheel and said second output shaft being selectively engageable to drive said propeller.

30. The roadable aircraft according to claim 24, including an automatic transmission for driving said drive wheel means from said at least one powerplant.

31. The roadable aircraft according to claim 24, including a rhomboid pattern wheel configuration comprising a single forwardly disposed wheel for steering during surface operation, with said drive wheel means comprising a single rearwardly disposed drive wheel, and a left and an opposite right outboard wheel, with said forwardly disposed wheel and said rearwardly disposed drive wheel being located along the centerline of said body structure.

32. The roadable aircraft according to claim 31, including means for at least partially retracting each said wheel.

33. The roadable aircraft according to claim 31, including means for individually extending said left and said right outboard wheel for counteracting centrifugal force effects when turning during surface operation.

34. The roadable aircraft according to claim 24, including starter means for said at least one powerplant and starter lockout means for preventing actuation of said starter means when at least each said wing panel and said empennage assembly are incompletely secured.

35. The roadable aircraft according to claim 24, including:
a flight control system, including a side mounted flight control stick and a left and a right rudder pedal for operating flight controls during flight operations, and a hand throttle for controlling said powerplant during flight operations; and
a ground control system, including a side mounted steering control stick for steering during surface operations, and a brake pedal and a throttle pedal for controlling speed during surface operations.

36. A roadable aircraft having a configuration as follows:
a body structure for carrying at least one person therein;
said body structure including a forward portion, a central portion, and a rearward portion, and at least one powerplant installed therein;
a left and an opposite right wing panel, each foldably and removably attached to said body structure;
an empennage assembly, foldably and removably attached to said body structure; and four wheels, comprising a centerline forward wheel for steering during surface operation, a centerline rearward drive wheel, and a left and an opposite right outboard wheel, disposed in a rhomboid pattern.

37. The roadable aircraft according to claim 36, including:

an articulated folding mechanism attaching each said wing panel to said body structure, with each said folding mechanism comprising means for rotating each respective said wing panel about a spanwise axis and for folding each said wing panel rearwardly and generally parallel to said body structure when in a folded configuration;

each said wing panel further including an inboard portion, an outboard portion, and an intermediate folding axis therebetween, with said intermediate folding axis comprising means for folding said outboard portion to lie adjacent said inboard portion when in a folded configuration;

said empennage assembly including a left and a right tail boom extending from said rear portion of said body structure; and each said tail boom including hinge means therein for folding said empennage assembly upwardly and forwardly to lie over said rearward portion of said body structure when in a folded configuration.

38. The roadable aircraft according to claim 36, wherein said empennage assembly comprises a left and a right flight surface extending from said upper structure of said rear portion of said body structure, with said left and said right tail boom extending rearwardly respectively from each said flight surface;

each said tail boom having a rearward portion, with a horizontal stabilizer and elevator permanently affixed between said rearward portion of each said tail boom; and said rearward portion of each said tail boom further having a vertical flight surface extending upwardly therefrom.

39. The roadable aircraft according to claim 36, including a baggage compartment removably installable to said upper structure of said rearward portion of said body structure when said empennage assembly is removed therefrom.

40. The roadable aircraft according to claim 36, including means for at least partially retracting each said wheel.

41. The roadable aircraft according to claim 36, including means for individually extending said left and said right outboard wheel for counteracting centrifugal force effects when turning during surface operation.

42. The roadable aircraft according to claim 36, including at least one powerplant comprising a horizontally opposed, multicylinder, four stroke reciprocating engine.

43. The roadable aircraft according to claim 42, including a propeller, with said at least one powerplant including a first and an opposite second output shaft, with said first output shaft being alternately and selectively engageable to drive said drive wheel and said second output shaft being alternately and selectively engageable to drive said propeller.

44. The roadable aircraft according to claim 42, including an automatic transmission for driving said drive wheel from said at least one powerplant.

45. The roadable aircraft according to claim 42, including starter means for said at least one powerplant and starter lockout means for preventing actuation of said starter means when at least each said wing panel and said empennage assembly are incompletely secured.

46. The roadable aircraft according to claim 36, including:

a flight control system, including a side mounted flight control stick and a left and a right rudder pedal for operating flight controls during flight operations, and a hand throttle for controlling said powerplant during flight operations; and a ground control system, including a side mounted steering control stick for steering during surface operations, and a brake pedal and a throttle pedal for controlling speed during surface operations.

47. A roadable aircraft having a configuration as follows:

a body structure for carrying at least one person therein;

said body structure including a forward portion, a central portion, and a rearward portion with an upper structure;

a left and an opposite right wing panel, each foldably and removably attached to said body structure;

an empennage assembly, foldably and removably attached to said body structure;

at least a left and an opposite right outboard wheel; and means for selectively extending and retracting said left and said right outboard wheel simultaneously for flight operation, and differentially for counteracting centrifugal force when turning during surface operation.

48. The roadable aircraft according to claim 47, including:

an articulated folding mechanism attaching each said wing panel to said body structure, with each said folding mechanism comprising means for rotating each respective said wing panel about a spanwise axis and for folding each said wing panel rearwardly and generally parallel to said body structure when in a folded configuration;

each said wing panel further including an inboard portion, an outboard portion, and an intermediate folding axis therebetween, with said intermediate folding axis comprising means for folding said outboard portion to lie adjacent said inboard portion when in a folded configuration;

said empennage assembly including a left and a right tail boom extending from said rear portion of said body structure; and each said tail boom including hinge means therein for folding said empennage assembly upwardly and forwardly to lie over said rearward portion of said body structure when in a folded configuration.

49. The roadable aircraft according to claim 47, wherein said empennage assembly comprises a left and a right flight surface extending from said upper structure of said rear portion of said body structure, with said left and said right tail boom extending rearwardly respectively from each said flight surface;

each said tail boom having a rearward portion, with a horizontal stabilizer and elevator permanently affixed between said rearward portion of each said tail boom; and said rearward portion of each said tail boom further having a vertical flight surface extending upwardly therefrom.

50. The roadable aircraft according to claim 47, including a baggage compartment removably installable to said upper structure of said rearward portion of said body structure when said empennage assembly is removed therefrom.

51. The roadable aircraft according to claim 47, including a rhomboid pattern wheel configuration comprising a single forwardly disposed wheel for steering during surface operation, a single rearwardly disposed drive wheel, and said left and said opposite right outboard wheel, with said forwardly disposed wheel and said rearwardly disposed wheel being located along the centerline of said body structure.

52. The roadable aircraft according to claim 51, including means for at least partially retracting each said wheel.

53. The roadable aircraft according to claim 47, including at least one powerplant comprising a horizontally opposed, multicylinder, four stroke reciprocating engine.

54. The roadable aircraft according to claim 53, including at least one drive wheel and a propeller, with said at least one powerplant including a first and an opposite second output shaft, with said first output shaft being alternately and selectively engageable to drive said drive wheel and said second output shaft being alternately and selectively engageable to drive said propeller.

55. The roadable aircraft according to claim 53, including an automatic transmission for driving said drive wheel from said at least one powerplant.

56. The roadable aircraft according to claim 53, including starter means for said at least one powerplant and starter lockout means for preventing actuation of said starter means when at least each said wing panel and said empennage assembly are incompletely secured.

57. The roadable aircraft according to claim 47, including:
a flight control system, including a side mounted flight control stick and a left and a right rudder pedal for operating flight controls during flight operations, and a hand throttle for controlling said powerplant during flight operations; and
a ground control system, including a side mounted steering control stick for steering during surface operations, and a brake pedal and a throttle pedal for controlling speed during surface operations.

58. A roadable aircraft having a configuration as follows:
a body structure for carrying at least one person therein, including a forward portion, a central portion, and a rearward portion, and at least one powerplant installed therein;
a left and an opposite right wing panel, each foldably and removably attached to said body structure and respectively including a left and a right aileron;
an empennage assembly, foldably and removably attached to said body structure;
a flight control system, including a side mounted flight control stick and a left and a right rudder pedal for operating flight controls during flight operations, and a hand throttle for controlling said powerplant during flight operations; and
a ground control system, including a side mounted steering control stick for steering during surface operations, and a brake pedal and a throttle pedal for controlling speed during surface operations.

59. The roadable aircraft according to claim 58, including:
an articulated folding mechanism attaching each said wing panel to said body structure, with each said folding mechanism comprising means for rotating each respective said wing panel about a spanwise axis and for folding each said wing panel rearwardly and generally parallel to said body structure when in a folded configuration;
each said wing panel further including an inboard portion, an outboard portion, and an intermediate folding axis therebetween, with said intermediate folding axis comprising means for folding said outboard portion to lie adjacent said inboard portion when in a folded configuration;

said empennage assembly including a left and a right tail boom extending from said rear portion of said body structure; and
each said tail boom including hinge means therein for folding said empennage assembly upwardly and forwardly to lie over said rearward portion of said body structure when in a folded configuration.

60. The roadable aircraft according to claim 58, wherein said empennage assembly comprises a left and a right flight surface extending from said upper structure of said rear portion of said body structure, with said left and said right tail boom extending rearwardly respectively from each said flight surface;
each said tail boom having a rearward portion, with a horizontal stabilizer and elevator permanently affixed between said rearward portion of each said tail boom; and
said rearward portion of each said tail boom further having a vertical flight surface extending upwardly therefrom.

61. The roadable aircraft according to claim 60, including a baggage compartment removably installable to said upper structure of said rearward portion of said body structure when said empennage assembly is removed therefrom.

62. The roadable aircraft according to claim 58, wherein said at least one powerplant comprises a horizontally opposed, multicylinder, four stroke reciprocating engine.

63. The roadable aircraft according to claim 58, including at least one drive wheel and a propeller, with said at least one powerplant including a first and an opposite second output shaft, with said first output shaft being alternately and selectively engageable to drive said drive wheel and said second output shaft being selectively engageable to drive said propeller.

64. The roadable aircraft according to claim 63, including an automatic transmission for driving said drive wheel from said at least one powerplant.

65. The roadable aircraft according to claim 58, including a rhomboid pattern wheel configuration comprising a single forwardly disposed wheel for steering during surface operation, a single rearwardly disposed drive wheel, and a left and an opposite right outboard wheel, with said forwardly disposed wheel and said rearwardly disposed wheel being located along the centerline of said body structure.

66. The roadable aircraft according to claim 65, including means for at least partially retracting each said wheel.

67. The roadable aircraft according to claim 65, including means for individually extending said left and said right outboard wheel for counteracting centrifugal force effects when turning during surface operation.

68. The roadable aircraft according to claim 58, including starter means for said at least one powerplant and starter lockout means for preventing actuation of said starter means when at least each said wing panel and said empennage assembly are incompletely secured.

69. The roadable aircraft according to claim 58, wherein said steering control stick and said hand throttle is mounted opposite said flight control stick and widely separated therefrom, said brake pedal is mounted to the left of said left rudder pedal, and said throttle pedal is mounted to the right of said right rudder pedal.

* * * * *